(12) United States Patent
Klein

(10) Patent No.: US 8,209,836 B2
(45) Date of Patent: Jul. 3, 2012

(54) WALL SUPPORT MOUNTING DEVICE

(75) Inventor: Don W. Klein, Cedarburg, WI (US)

(73) Assignee: Todd A. Rathe, Mequon, WI (US)

( * ) Notice: Subject to any disclaimer, the term of this patent is extended or adjusted under 35 U.S.C. 154(b) by 1045 days.

(21) Appl. No.: 12/143,733

(22) Filed: Jun. 20, 2008

(65) Prior Publication Data

US 2009/0100660 A1    Apr. 23, 2009

Related U.S. Application Data

(60) Provisional application No. 60/945,335, filed on Jun. 20, 2007, provisional application No. 60/956,883, filed on Aug. 20, 2007.

(51) Int. Cl.
*B23Q 1/00* (2006.01)

(52) U.S. Cl. ............. 29/283; 29/275; 29/276

(58) Field of Classification Search .......... 29/275, 29/276, 283
See application file for complete search history.

(56) References Cited

U.S. PATENT DOCUMENTS

| | | |
|---|---|---|
| 2,774,969 A | 12/1956 | Sampler |
| 3,166,757 A | 1/1965 | Downs, Jr. |
| 3,530,591 A | 9/1970 | Moffitt |
| 3,599,686 A | 8/1971 | Peebles |
| 3,883,064 A | 5/1975 | Hilgers |
| 4,037,632 A | 7/1977 | Arena |
| 4,220,309 A | 9/1980 | Eisen et al. |
| 4,228,982 A | 10/1980 | Sellera |
| 4,241,510 A | 12/1980 | Radecki |
| 4,249,297 A | 2/1981 | Waters |
| 4,382,337 A | 5/1983 | Bendick |
| 4,455,756 A | 6/1984 | Greene |
| 4,461,418 A | 7/1984 | Schaefer |
| 4,473,957 A | 10/1984 | Faulkner |
| 4,559,690 A | 12/1985 | Asmus |
| 4,637,583 A | 1/1987 | Babitz |
| 4,804,161 A | 2/1989 | Wallo |
| 4,821,992 A | 4/1989 | Johnson |
| 4,860,937 A | 8/1989 | Arnold |
| 4,874,123 A | 10/1989 | Mercer, II et al. |
| 4,893,776 A | 1/1990 | Floyd |
| 5,103,574 A | 4/1992 | Levy |
| 5,129,154 A | 7/1992 | Aydelott |
| 5,180,135 A | 1/1993 | Hindall |
| 5,398,906 A | 3/1995 | Aydelott |
| 5,520,318 A * | 5/1996 | Sloop ................. 227/32 |
| 5,867,917 A | 2/1999 | Karon |
| 6,053,468 A | 4/2000 | Francis |
| 6,185,831 B1 | 2/2001 | Pluciennik |
| 6,245,177 B1 | 6/2001 | Luhmann |
| 6,739,065 B2 | 5/2004 | Hofmeister |
| 7,159,329 B2 * | 1/2007 | Dolenz et al. .......... 33/666 |
| 2007/0125928 A1 | 6/2007 | Klein |

OTHER PUBLICATIONS

Picture Perfit User Guide, PerfiltWhite LLC (2007).

* cited by examiner

*Primary Examiner* — Lee D Wilson
*Assistant Examiner* — Shantese McDonald

(57) ABSTRACT

A wall support mounting device and method use at least one drive surface that moves in a plane or about an axis contained between the wall hanging and the wall as it couples at least one wall support to the wall.

20 Claims, 27 Drawing Sheets

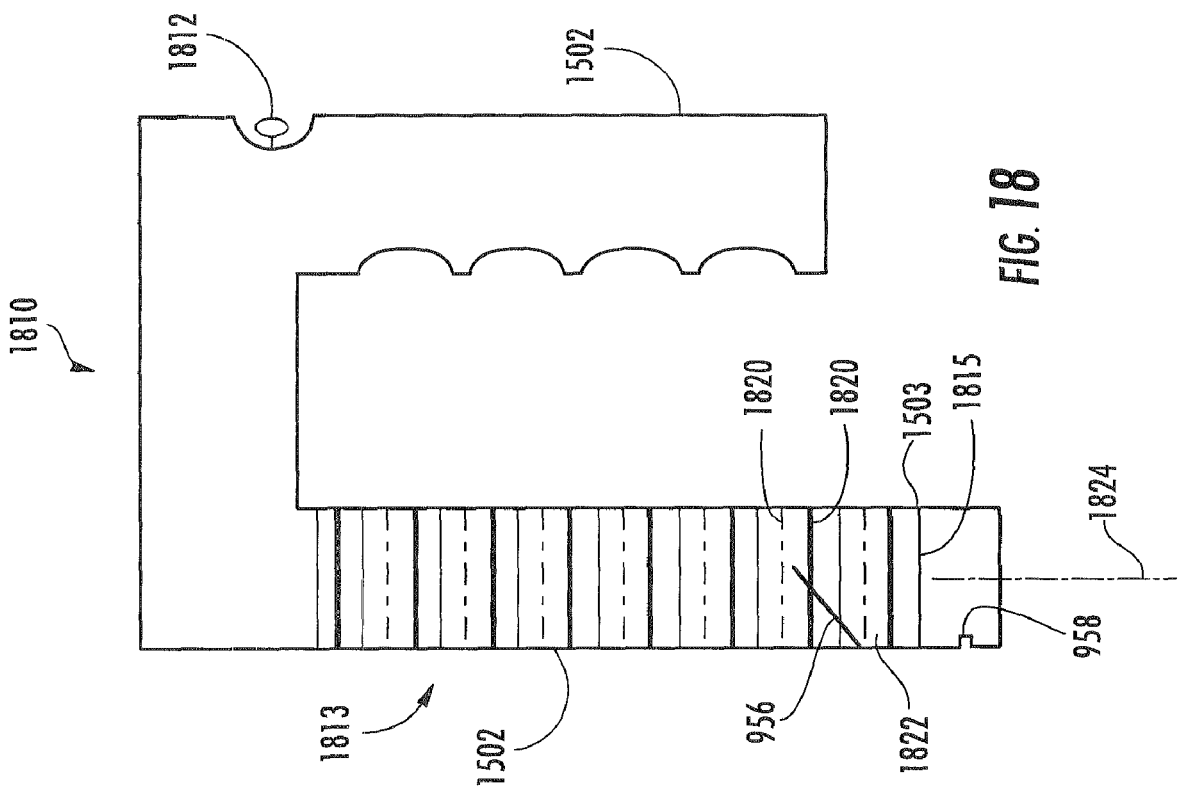
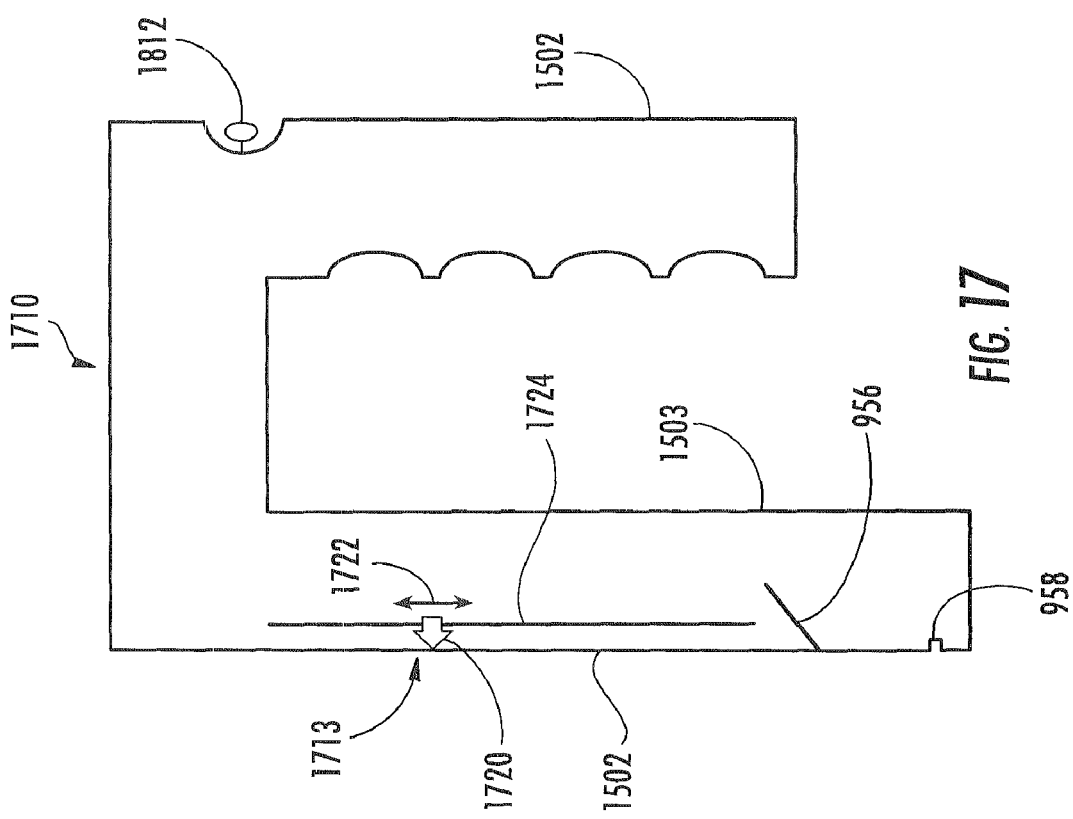

WALL SUPPORT MOUNTING DEVICE

CROSS-REFERENCE TO RELATED PATENT APPLICATIONS

The present patent application claims priority under 35 USC 119(e) from U.S. provisional patent application 60/945,335 filed on Jun. 20, 2007 by Don W. Klein and entitled WALL SUPPORT MOUNTING DEVICE, the full disclosure of which is hereby incorporated by reference.

The present patent application claims priority under 35 USC 119(e) from U.S. provisional patent application 60/956,883 filed on Aug. 20, 2007 by Don W. Klein and entitled WALL SUPPORT MOUNTING DEVICE, the full disclosure of which is hereby incorporated by reference.

BACKGROUND

Wall hangings, such as paintings, photographs, drawings, other framed or unframed works, wall mounted furniture or decorations such as curios, mirrors, candle holders and the like, and various wall mounted electronics, such as flat screen televisions, monitors and the like, come in a variety of shapes, sizes and configurations. Some wall hangings may be lifted and positioned along a vertical wall or a horizontal wall (i.e. ceiling) by a single person, while other wall hangings require multiple individuals to mount the wall hangings along a wall. Some wall hangings have mounting portions comprising wires from which, a wall hanging is hung. Other wall hangings have mounting portions comprising mounting extensions through which nails or other impelling members may extend into the wall or comprising brackets configured to rest upon or otherwise engage one or more nails or other wall imbedded members.

Regardless of the wall hanging configuration, its mounting portion or the wall support used to couple the wall hanging to the wall, mounting the wall hanging to a wall is difficult, tedious and time consuming. A properly mounted wall hanging is generally appropriately spaced, both vertically and horizontally, with respect to the dimensions of the wall, the location of other wall hangings along the same wall, or the location of other objects within the room. Meeting these demands is not an easy task. The person or persons mounting the wall hanging generally must measure the wall hanging itself, measure the wall, and measure the relative distances between various objects along the wall in an attempt to identify the desired position for the wall hanging. Once this is determined, the person mounting the wall hanging must then identify where the wall supports (i.e., nails, hooks, activatable bonding members and the like) must be coupled to the wall. In addition, the relative locations of the mounting portions on the back of the wall hanging must be accounted for when attaching the wall supports to the wall. If multiple wall supports are required, the relative positioning of the wall supports themselves must be carefully identified to ensure that the wall hanging will be level once in place.

Once the wall supports are actually mounted to the wall, the person mounting the wall hanging can only hope that his or her calculations were correct. The final outcome cannot generally be determined until the wall supports are embedded or otherwise attached to the wall and until the wall hanging is actually mounted upon the wall supports. Mounting the wall hanging upon the wall supports may reveal that the calculations were erroneously made, resulting in a wall hanging that is not level or positioned along the wall in undesirable spacing relative to other wall hangings or objects in the room. Moreover, once the wall hanging is actually mounted along the wall, and the person can actually see the wall hanging in place along the wall, the person may change his or her mind about the desired position of the wall hanging. Unfortunately, repositioning the wall hanging requires that the entire process be repeated and results in unsightly holes or other mounting marks along the wall that either must be concealed by the wall hanging, or must be spackled and/or covered with paint or wallpaper.

BRIEF DESCRIPTION OF THE DRAWINGS

FIG. 17 is a schematic illustration of another embodiment of the wall support mounting device of FIG. 1 according to an example embodiment.

FIG. 18 is a schematic illustration of another embodiment of the wall support mounting device of FIG. 1 according to an example embodiment.

DETAILED DESCRIPTION OF THE EXAMPLE EMBODIMENTS

Figure 1:
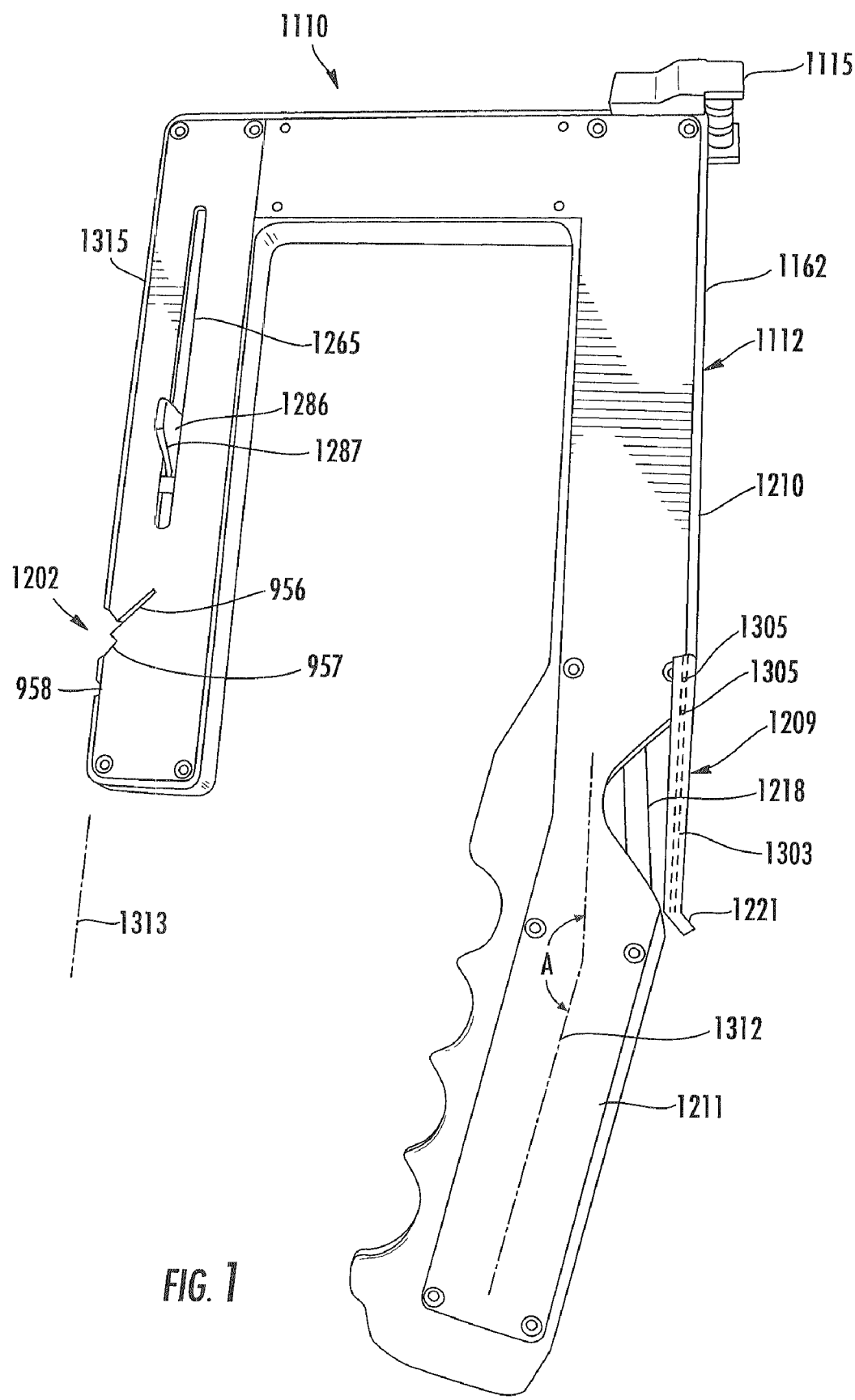
FIG. 1 is a left perspective view of a wall support mounting device according to an example embodiment.
Figure 2:
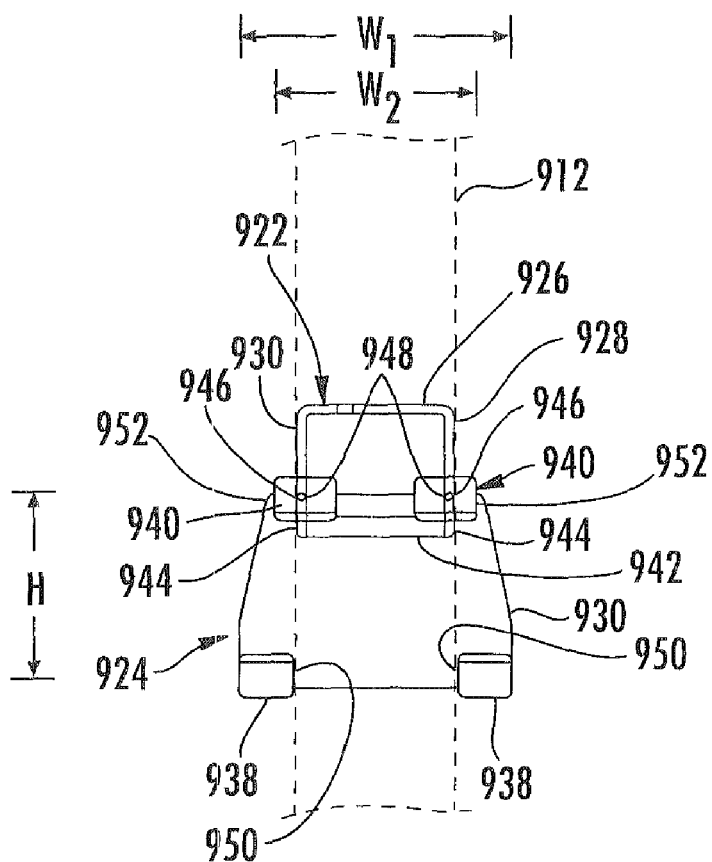
FIG. 2 is a rear elevational view of a wall support according to an example embodiment illustrating the wall support mounted upon the wall support mounting device of FIG. 1 (shown in broken lines).
Figure 3:
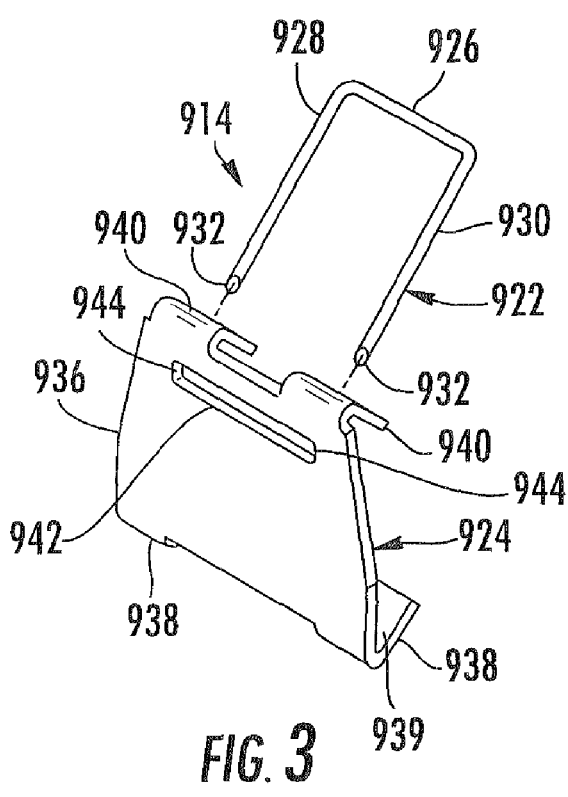
FIG. 3 is an exploded perspective view of the wall support of FIG. 2 according to an example embodiment.
Figure 4:
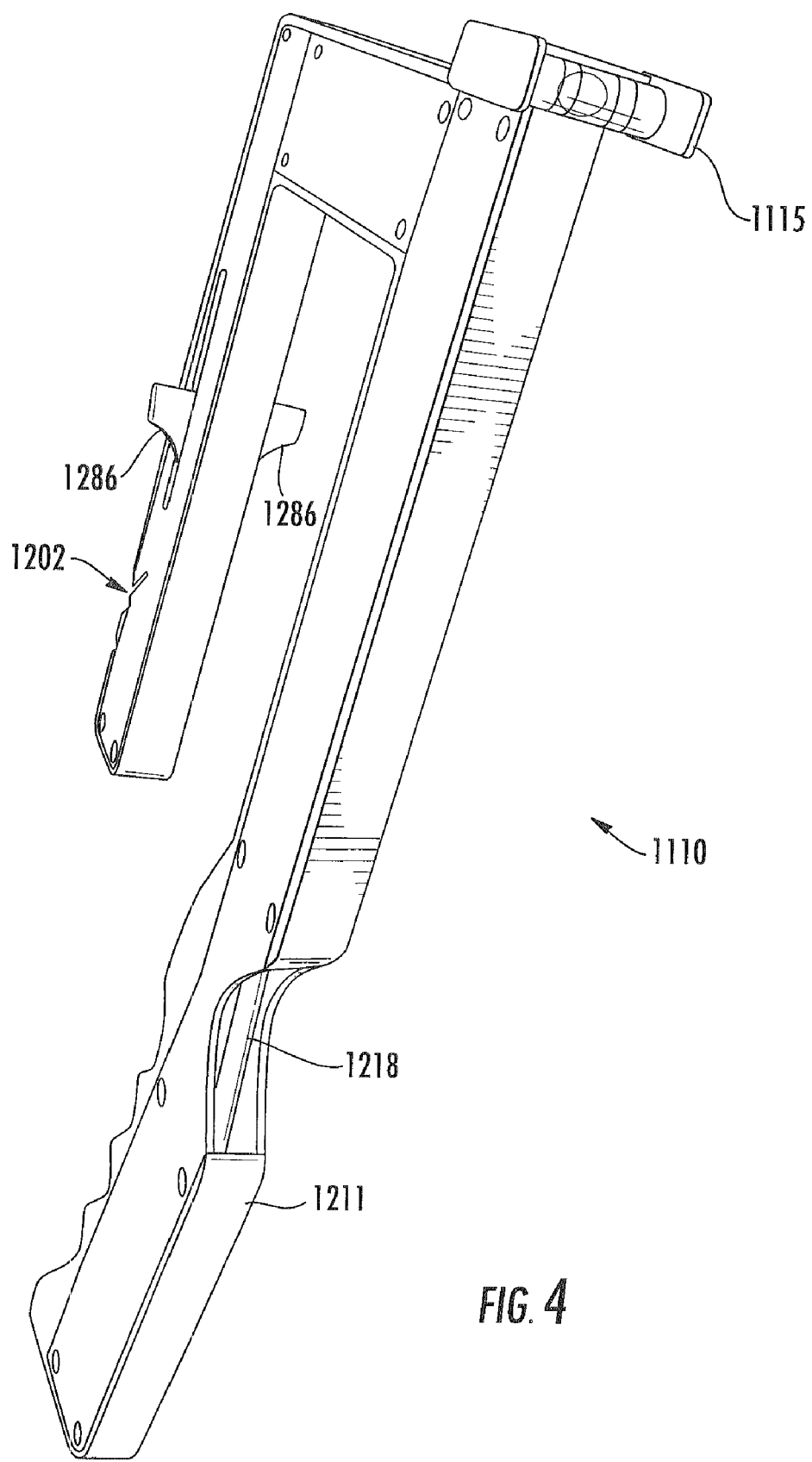
FIG. 4 is a rear perspective view of the wall support mounting device of FIG. 1 according to an example embodiment.
Figure 5:
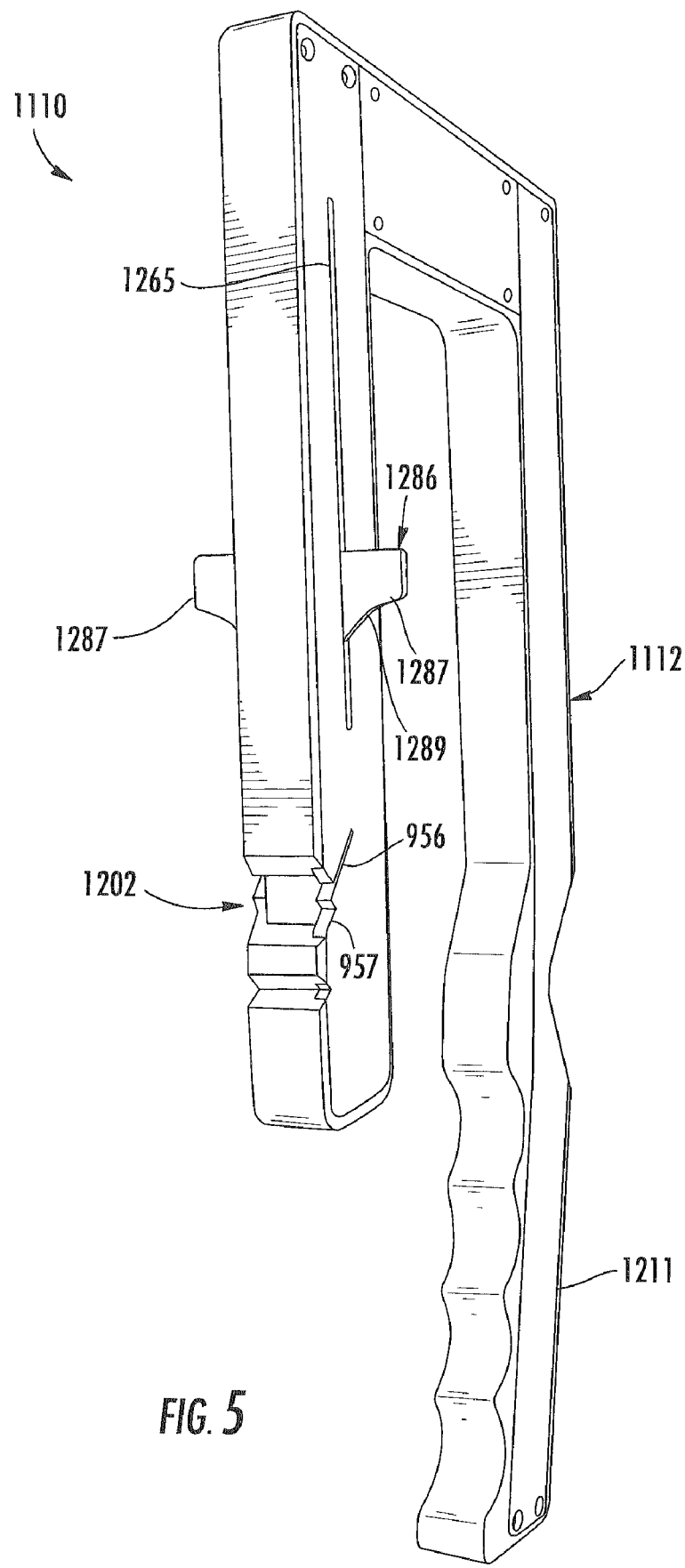
FIG. 5 is a front perspective view of the wall support mounting device of FIG. 1 according to an example embodiment.
Figure 6:
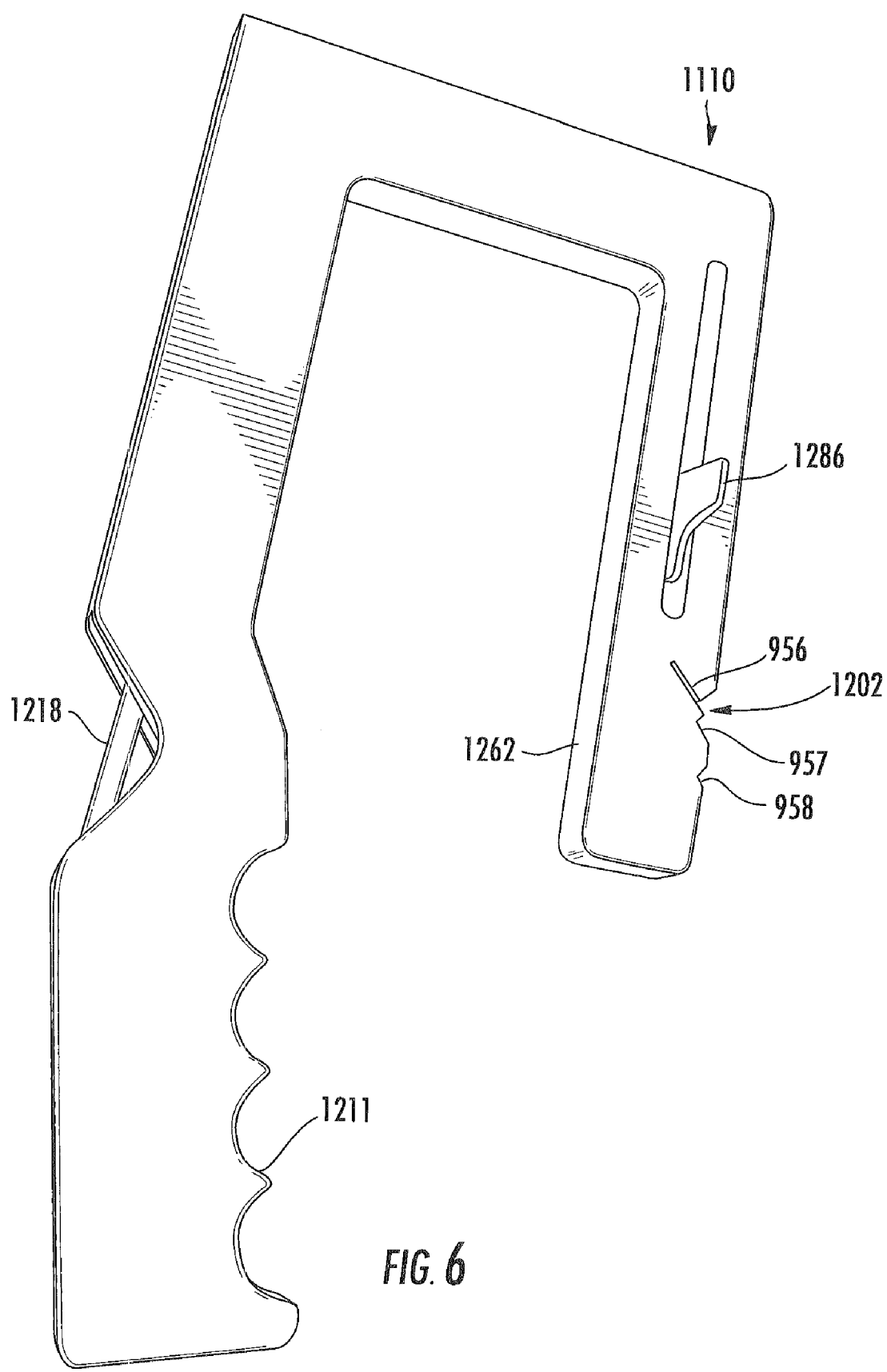
FIG. 6 is a right perspective view of the wall support mounting device of FIG. 1 according to an example embodiment.

FIGS. 1-14 illustrate wall support mounting device 1110 according to an example embodiment. Wall support mounting device 1110 is configured to couple a wall support for a wall hanging having a mounting portion to a wall. In the particular example illustrated, wall support mounting device 1110 is configured to impel a portion of a wall support into a wall, wherein a wall hanging may be subsequently positioned on the wall support. One example of a wall support is wall support 914 is shown in FIGS. 2-3. In the particular example shown, wall support 914 includes a portion configured to be impelled into a wall by coupling unit 912. As shown by FIG. 3, wall support 914 includes impeller 922 and hanger 924. Impeller 922 comprises a fastener or other structure configured to extend into the wall while being coupled to hanger 924 to affix hanger 924 to a wall. In the particular example shown, impeller 922 passes through hanger 924 and into the wall after being impelled into a wall. In other embodiments, impeller 922 may alternatively extend from a single side of hanger 924, wherein coupling unit 912 applies force to portions of hanger 924 which are transmitted to impeller 922 to drive impeller 922 into a wall.

In the particular example shown, impeller 922 comprises a fastener having a head 926 and tines or prongs 928, 930. Head 926 comprises that portion of impeller 922 configured to be struck or driven by coupling unit 912. Prongs 928, 930 have sufficiently pointed ends 932 so as to penetrate the wall, allowing a remainder of prongs 928, 930 to be driven into a wall. Prongs 928, 930 each have a diameter of thickness sufficiently small such that the holes formed in the wall by the impelling of prongs 928 and 930 are deminimus and substantially imperceptible to a human eye from about 6 inches away from the surface of the wall. At the same time, prongs 928, 930 have a sufficient length to enable impeller 922 to cooperate with hanger 924 to support hanger 924 from a mounting portion 18 and wall hanging along a wall. In the particular example shown, impeller 922 is formed from a metal, such as steel or brass. Head 926 has a length of at least 0.4 inches (nominally 0.52 inches). Prongs 928, 930 each have a diameter of no greater than 0.04 inches and a length extending from head 926 of at least 0.8 inches. Prongs 928 and 930 have a length sufficient such that at least about 0.6 inches of each of prongs 928, 930 extends into the wall to support hanger 924 relative to the wall. Although prongs 928, 930 are illustrated as having substantially the same diameter as head 926, prongs 928, 930 and head 926 may have differing diameters or thicknesses. Moreover, in other embodiments, depending on the configuration of hanger 924, impeller 922 may have other shapes, sizes and configurations and may be made from other materials. For example, in another embodiment, impeller 922 may include greater than 2 tongs for increased fastening. In still other embodiments, impeller 922 may alternatively have a round flat head 926 and a single tong or pointed shaft similar to that of a nail.

Hanger 924 comprises a structure configured to be supported adjacent to a wall and be subsequently support a mounting portion of a walking, such as a wire connected at both ends to a wall hanging. Hanger 924 includes main portion 936, lower hooks 938 and extensions 940. Main portion 936 comprises a main structure having the main surfaces which are configured to lie face against the wall. In the particular example shown, main portion 936 has a width $w_1$ of about 1.1 inches along hooks 938, a width $w_2$ of about 0.76 inches at extensions 940 and a height h of about 0.76 inches. The surface area of main portion 936 distributes forces across the wall, enabling hanger 924 to more stably support mounting portion 18 and wall hanging 20.

Hooks 938 extend from main portion 936 and are configured to form a channel 939 configured to receive mounting portion 18. As shown by FIG. 2, hooks 938 engage an underside of mounting portion 18 and are spaced apart from one another by a distance $d_1$ of approximately 0.6 inches. In other embodiments, hanger 924 may consist of greater than 2 hooks or fewer than 2 hooks which may be spaced apart from one another or which may continuously extend along main portion 936. Hooks 938 generally face in a common upward direction.

As further shown by FIG. 2, inner edges 950 of extensions 940 are spaced from one another to receive portions of coupling unit 912. In the particular example shown, edges 950 are spaced so as to frictionally engage portions of coupling unit 912 to assist in retaining wall support 914 relative to coupling unit 912. Such frictional engagement results in a friction fit or slip fit retaining hanger 924 on coupling unit 912. In the example shown, edges 950 and main portion 936 wrap about three sides of mounting portion 9112 to assist in retaining wall support 914 relative to coupling unit 912.

Main portion 936 includes an elongate slot 942 proximate to extensions 940. Slot 942 generally is an opening through which prongs 928, 930 extend. Slot 942 is configured such that edges 944 adjacent to slot 942 face and potentially engage opposite outer sides of prongs 928 and 930 passing through slot 942. Edges 944 guide movement of prongs 928, 930 through slot 942 and into the wall. Edges 944 assist in preventing prongs 928, 930 from splaying outward, away from one another as force is being applied to head 926 during impelling of prongs 928, 930 into a wall. Because the opening in main portion 936 through which prongs 928, 930 is formed as a slot, slot 942 accommodates tolerance variations of slot 942 as well as impeller 922. At the same time, friction between main portion 936 and prongs 928, 930 is reduced to facilitate impelling of impeller 922 into the wall. Alternatively, in other embodiments, slot 942 may be replaced with a pair of spaced openings through main portion 936.

Extensions 940 project from main portion 936 and are configured to secure impeller 922 to hanger 924. In the particular example shown, projections 940 comprise downwardly angled tabs generally opposite hooks 938 above slot 942 of main portion 936. Extensions 940 include openings 946. Openings 946 are configured to facilitate sliding movement of prongs 928, 930 therethrough, through slot 942 and into the wall. Openings 946 guide movement of impeller 922 and assist in retaining impeller 922 relative to hanger 924. Openings 946 are configured such that extensions 940 have inner edges 948 engaging the inner sides of each of prongs 928 and 930. Edges 948 assist in preventing prongs 928, 930 from deforming inwardly towards one another. Edges 948 further frictionally engage prongs 928, 930 to a sufficient degree such that impeller 922 does not freely slide relative to hanger 924, but remains in place until driven by coupling unit 912. Overall, edges 944 and 948 cooperate with one another by engaging opposite sides of prongs 928 and 930 to guide movement of prongs 928 and 930.

In other embodiments, slot 942 and openings 946 may have other configurations while still guiding prongs 928 and 930. For example, in another embodiment, in lieu of comprising a completely bounded opening, slot 942 may alternatively comprise two slots inwardly extending from an outer edge of main portion 936 such that the edges of main portion 936 engage inner sides of prongs 928 and 930. In such an embodiment, openings 946 may be configured as shown or may comprise outwardly extending channels or slots extending from side edges 950 of extensions 940 such that portions of extension 940 engage inner sides of prongs 928, 930. In still other embodiments, openings 946 may alternatively comprise slots, channels or cutouts extending from outer sides 952 of extensions 940, wherein edges of extensions 940 still engage the inner sides of prongs 928, 930.

In other embodiments, in lieu of having two spaced extensions 940, hanger 924 may alternatively have a single continuous extension 940 provided with both openings 946 or other opening configurations or may include greater than two such extensions 940. For example, hanger 924 may include additional extensions 940 depending upon the number of prongs provided by impeller 922. In still other embodiments, hanger 924 may include greater than two extensions 940 to enable hanger 924 to be utilized with a multitude of differently configured and differently sized impellers 922.

Wall support mounting device 1110 includes a coupling unit 1112 and level indicator 1115. Level indicator 1115 comprises a mechanism configured to communicate to the user whether coupling unit 1112 is itself in a level orientation when mounting a wall hanging to a wall. In the particular embodiment illustrated, level indicator 1115 comprises a bubble level indicator coupled to housing 1162 of coupling unit 1112 proximate to a top of housing 1162. In other embodiments, level indicator 1115 may be provided at other locations or may be omitted.

Coupling unit 1112 comprise a member configured to couple a wall support 914 (shown in FIGS. 2-3) to a wall. In the particular embodiments shown, coupling unit 1112 is configured to impel a portion of wall support 914 into a wall and to subsequently receive the wire of wall hanging to support the walking. When used with wall support 914, coupling unit 1112 is configured to impel impeller 922 (shown in FIG. 3) into a wall. Coupling unit 1112 includes wall support holder 1202, wall interface 1203, drive mechanism 1204 (shown in FIG. 7), loading mechanism 1206 (shown in FIG. 7), trigger mechanism 1208, trigger disabler 1209 (shown in FIG. 1) and handle 1211.

Wall support holder 1202 includes at least one retention surface configured to temporarily and releasably retaining wall support 914 in place as drive mechanism 1204 drives impeller 922 into the wall. Wall support holder 1202 retains wall support 914 while mounting portion 918 is received within channels of hooks 938. In other embodiments, wall support holder 1202 may alternatively be configured to hold and releasably retain other wall supports used for mounting a wall hanging to a wall.

Figure 13:
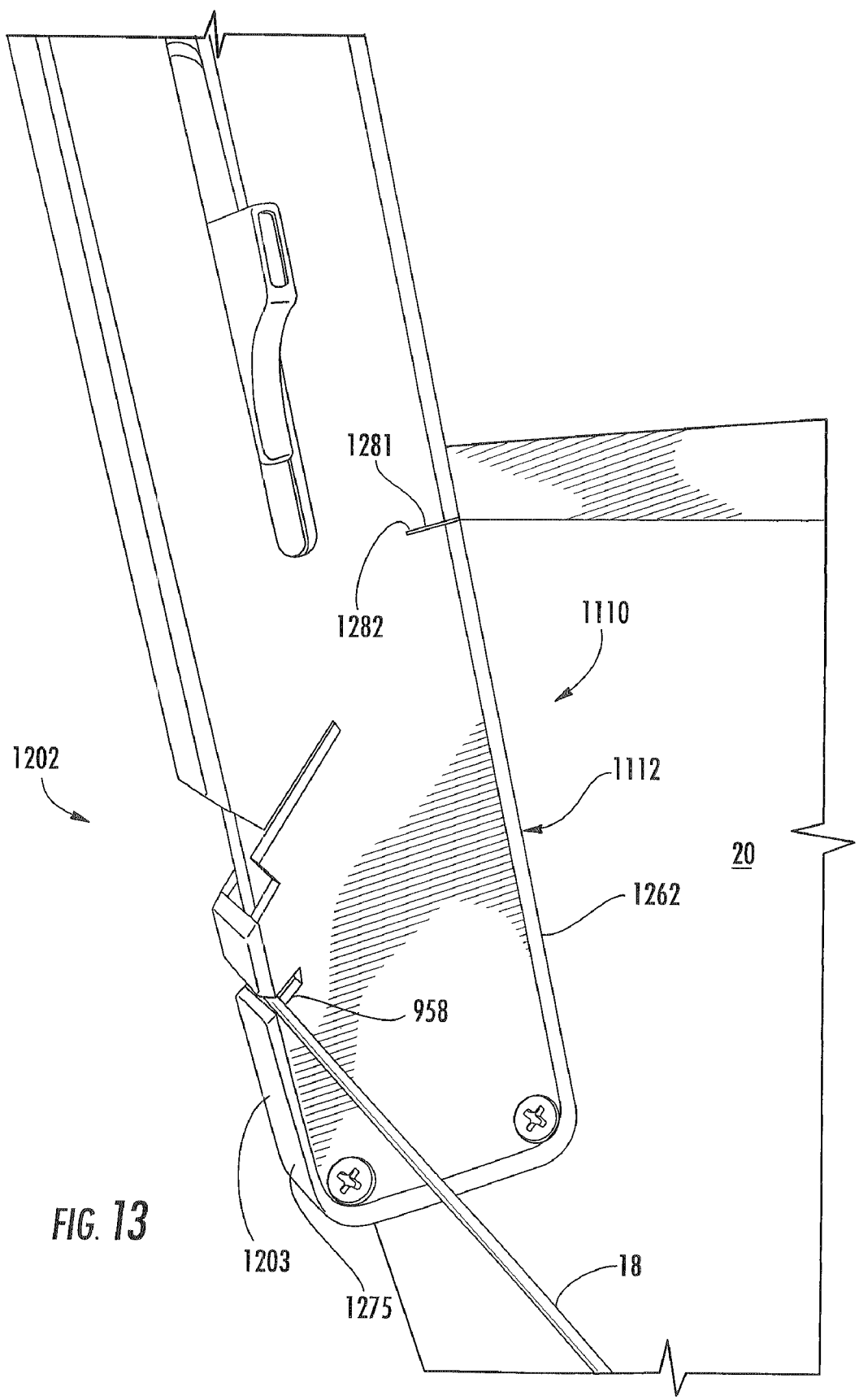
FIG. 13 is an enlarged fragment or perspective you of the wall support mounting device of FIG. 1 positioned adjacent a wall hanging.

As shown by FIG. 13, wall support holder 1002 includes channel 956, recess 957 and recess 958. Channel 956 comprises an opening extending into housing 1262 of drive mechanism 404. Channel 956 is configured to receive head 926 of impeller 922. Channel 956 is angled relative to a horizontal plane to accommodate impeller 922 which is also angled relative to the horizontal plane. In the particular example shown, impeller 922 extends through hanger 924 at an angle θ of approximately 45 degrees. It has been found that this angle maximizes the retention capability of impeller 922. In other embodiments, the angle at which impeller 922 extends from hanger 924 and the angle at which channel 938 extends into housing 1262 may be varied. Channel 956 engages an underside of head 926 to further guide movement of impeller 922 as impeller 922 is being driven by drive mechanism 1004. In other embodiments, channel 956 may be longer such that channel 956 does not guide or contact an underside of head 926 or an underside of prongs 928, 930.

Recess 957 comprises an opening, notch, cut out, cavity or depression extending into the front face 1275 of housing 1262. Recess 957 is configured to receive portions of wall support 914 such that wall support 914 may be held in closer proximity to face 1275 during mounting. In the particular example illustrated, recess 957 is configured to receive extensions 9140 of hanger 924 such that main portion 936 may wrap about three sides of housing 1262 while extending in a plane substantially parallel to face 1275, substantially flush against face 1275. Although recess 957 is illustrated as a V-shaped notch, in other embodiments, recess 957 may have other shapes and dimensions depending upon the configuration of hanger 924. In particular embodiments, recess 957 may be omitted.

Recess 958 comprises a cutout, notch, depression or the like extending into phase 960 of housing 1262 below channel 956. Recess 958 has a depth of at least a thickness of mounting portion 18. Is respect FIG. 13, recess 958 permits the wall hanging to be mounted to be hung from device 1110 prior to mounting of the wall support to the wall to enable a person to determine or estimate where the top or other selected portion of the wall hanging will be located if the device 1110 is positioned against the wall at a selected location during mounting of the wall support.

In the particular example illustrated, recess 958 is configured to receive portions of mounting portion 18 (portions of a wire in particular embodiments. In the particular example illustrated, recess 958 has a floor 1060 which is angled upwardly and forwardly in a vertical direction towards channel 956. In other embodiments, floor 1060 may alternatively extend substantially horizontal (substantially perpendicular to face 1275). In particular embodiments, where floor 1060 is either horizontal or is angled upwardly and forwardly as shown in FIG. 13, housing 1262 of coupling unit 912 may support a substantial portion of the weight of the wall hanging to be subsequently mounted on the wall support.

As mentioned above, hooks 938 extend opposite to and frictionally engage opposite sides 1066 of housing 1262 to frictionally hold and retain hanger 924 in place with respect to coupling unit 912 during mounting. Because hooks 938 frictionally engage sides 1066 of housing 1262, housing 1262 may be wider, providing additional space for internal componentry of coupling unit 912. In addition, the frictional engagement between hooks 938 and housing 1262 is wider, providing a wider and lower base or foundation for enhanced retention of hanger 924.

In still other embodiments, retention of hanger 924 relative to face 1275 may be assisted in additional manners. For example, channel 956 may be configured to frictionally engage portions of impeller 922 to assist in holding hanger 924 in place. Surfaces of channel 957 may also be configured or formed a material so as to have a higher coefficient of friction with the engage portions of extensions 940 to further assist in retaining hanger 924 against face 1275. In one embodiment, holder 1002 may alternatively or additionally include a projection or ledge along housing 1262 configured and located to engage and support a lower edge of wall support. In still other embodiments, holder 1002 may alternatively comprise a surface configured to grip an outer edge of wall support 914. In particular embodiments, the friction fit between hooks 938 and housing 1262 may be lessened or may be omitted where wall support 914 is held in place with respect to coupling unit 912 in other manners.

FIG. 13 further illustrates wall interface 1203. Wall interface 1203 comprises a structure a mechanism along face 1275 configured to lessen frictional or other resistance between coupling unit 912 and the adjacent wall as coupling unit 912 is positioned against the adjacent wall and is potentially moved along the adjacent wall prior to, during and after mounting of wall hanging 20. In the example illustrated, wall interface 1003 is located in close proximity to wall holder 1202. In the example illustrated, wall interface 1003 is located vertically below recess 958 on an opposite side of recess to remind 58 as channel 956. As a result, interface 1203 is located where relatively large frictional forces that would otherwise occur between coupling unit 912 during positioning of coupling unit 1112 relative to the wall.

In the example illustrated, wall interface 1203 comprises a pad having a surface formed from one or more materials and having a texture so as to have a relatively low coefficient of friction with the adjacent wall surface. In the example illustrated, wall interface 1003 comprises a pad of smooth nylon or polytetrafluoroethylene (TEFLON). In other embodiments, other low friction materials may be employed. In still other embodiments, wall interface 1203 may include one or more movable bearing mechanisms. For example, wall interface 1203 the alternatively comprise one or more balls or rod bearing assemblies, wherein the balls or rods rotate as coupling unit 1112 is moved relative to an adjacent wall surface. In other embodiments, wall interface 1203 may have other locations or may be omitted.

Drive mechanism 1204 comprise a mechanism configured to drive our impel impeller 922 (shown in FIG. 3) into a wall. Drive mechanism 1204 includes frame, enclosure, support structure, or housing 1262 and drive unit 1264. Housing 1262 substantially encloses drive unit 1264. Housing 1262 further guides and directs movement of drive unit 1264. That portion of housing 1262 extending about drive unit 1254 has a width $W_3$ (shown in FIG. 23) configured to extend between a back surface of wall hanging 20 and a wall while wall support 914 is positioned against the wall and while mounting portion 918 extends from a wall hanging into engagement with wall support 914.

Figure 7:
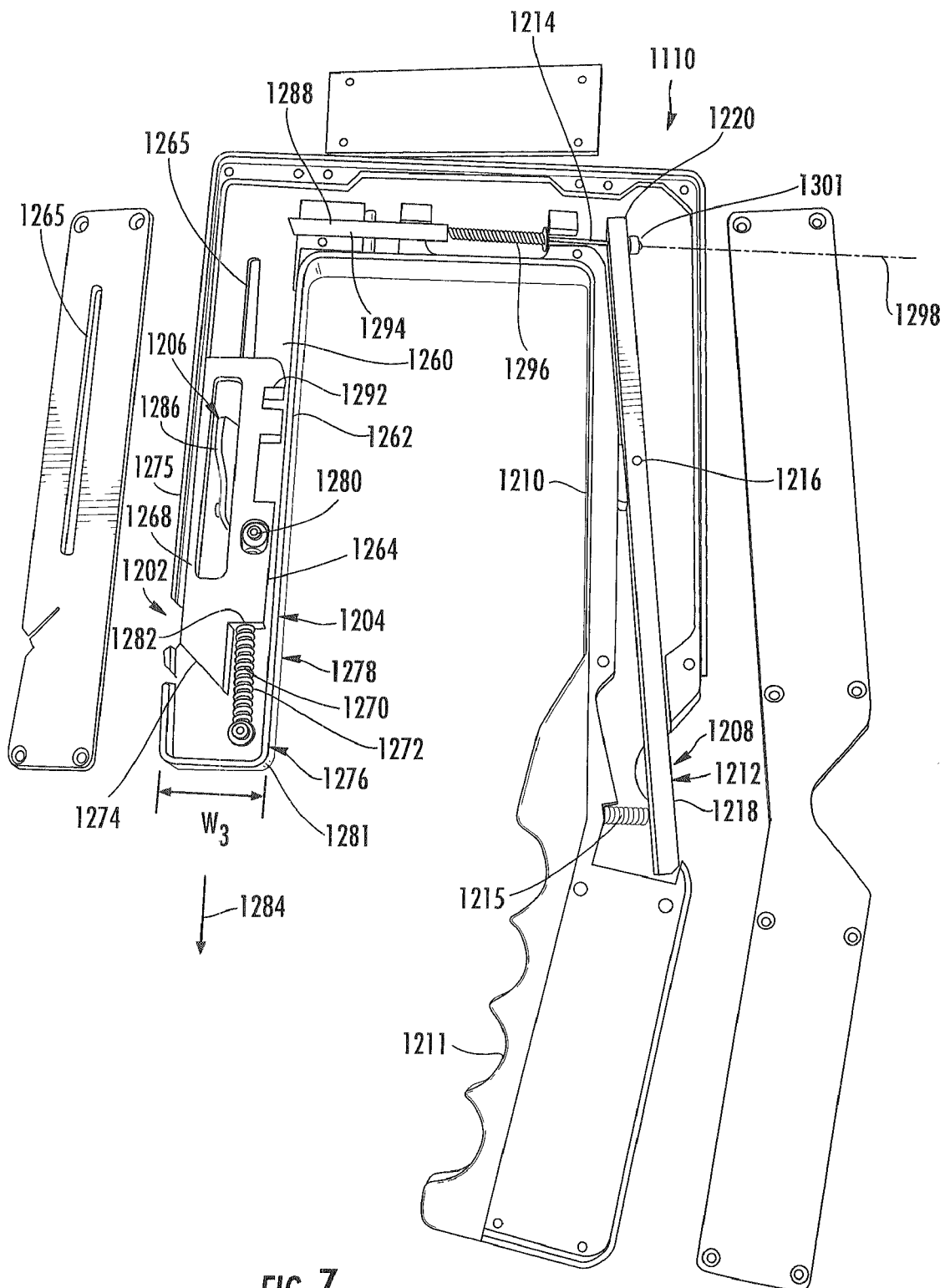
FIG. 7 is an exploded left perspective view of the wall support mounting device of FIG. 1 according to an example embodiment.
Figure 8:
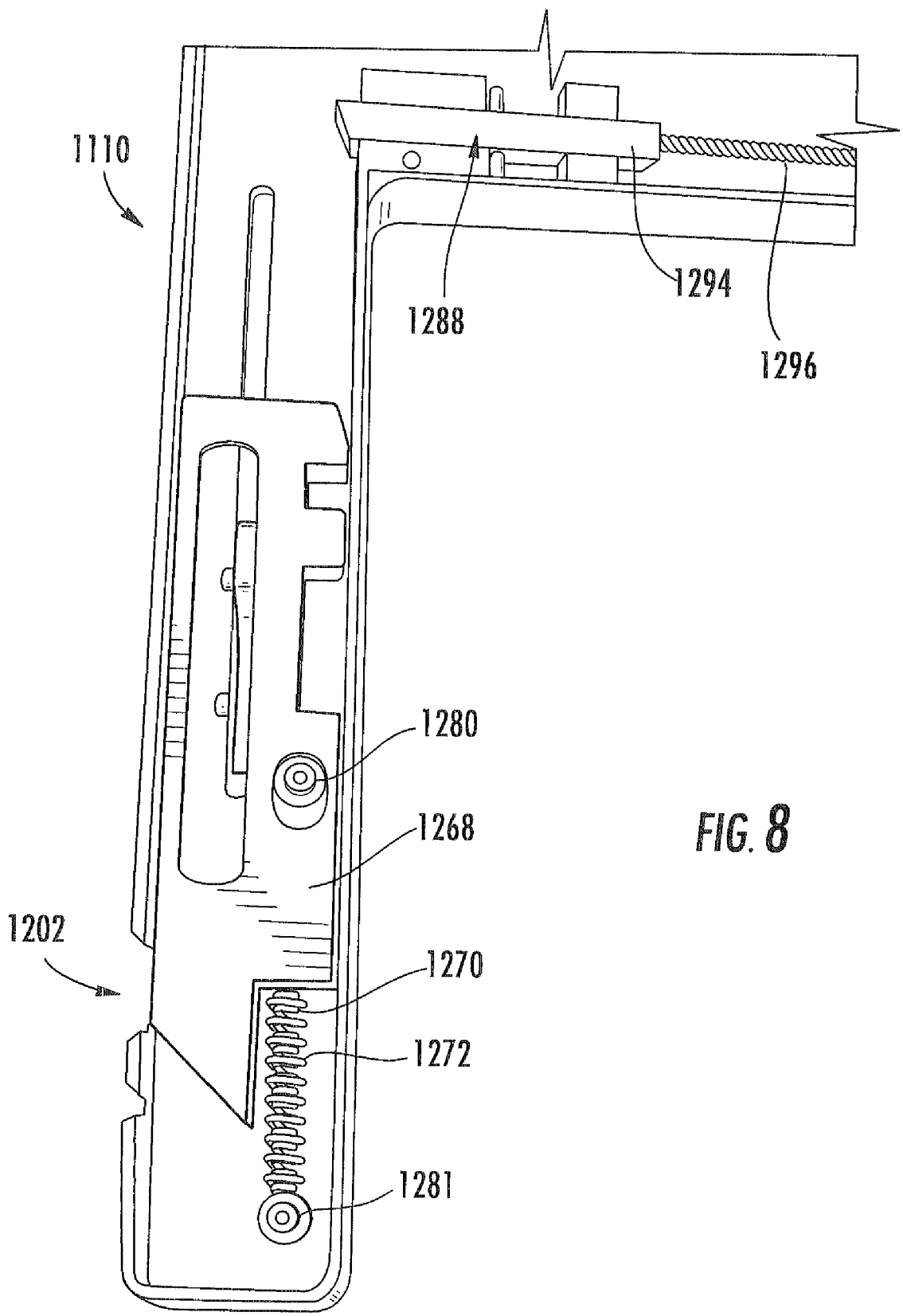
FIG. 8 is an enlarged fragmentary perspective view of a portion of the wall support mounting device of FIG. 7 according to an example embodiment.
Figure 9:
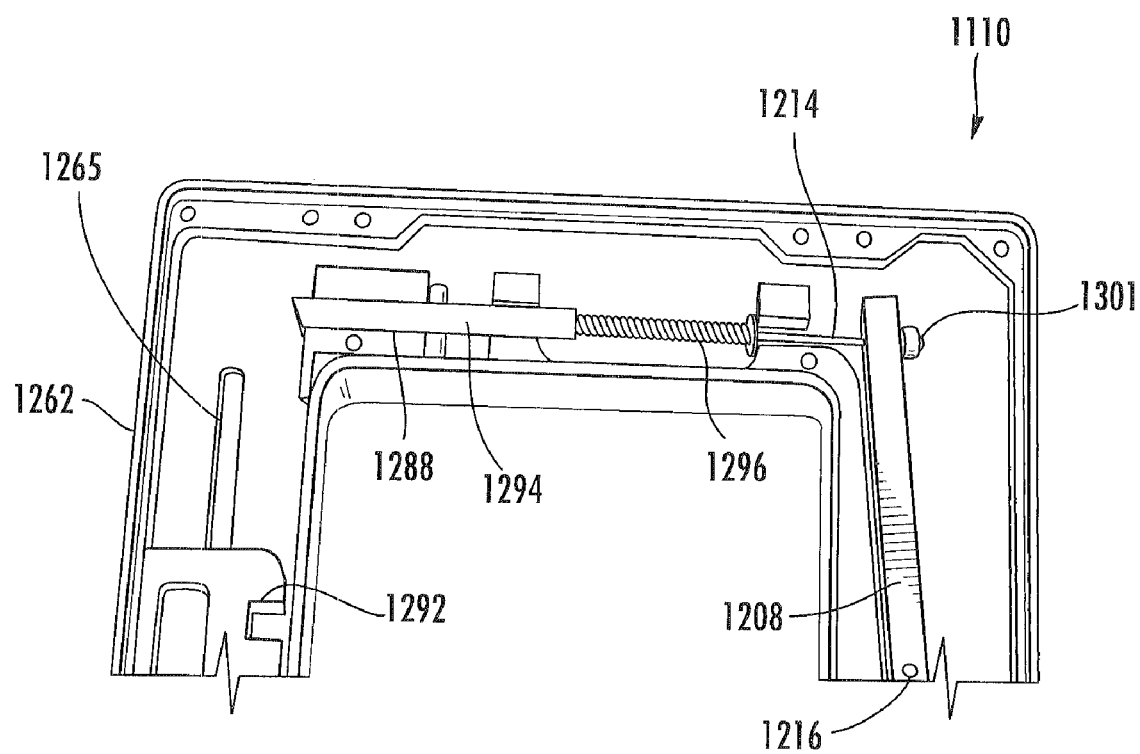
FIG. 9 is an enlarged fragmentary perspective view of another portion of the wall support mounting device of FIG. 7 according to an example embodiment.

As further shown by FIG. 7, housing includes an elongate channel 1260 which receives drive unit end a pair of opposing elongate slots 1265 on opposite side of channel 1260. Slots 1265 slightly receive portion of the loading mechanism 1206 and enable loading mechanism 1206 to project outside of housing 1262 for being manually engaged (i.e. physically contacted by a person's hand such that force may be applied thereto). Slots 1265 further assist in guiding movement of drive unit 1204.

Drive unit 1204 is essentially contained within housing 1262 and engages impeller 922 (shown in FIG. 3) drive impeller 922. Drive unit 1264 includes slide, drive bar or drive member 1268, spring 1270 and spring 1272. Drive member 1268 extends within housing 1262 and includes drive surface 1274. Drive surface 1274 comprises a surface configured to engage head 926 of impeller 922 says to exert a force upon impeller 920 to drive impeller 922 into the wall. Drive surface 1274 is generally angle with respect to a horizontal plane when the front a vertical surface 1275 of housing 1262 is substantially positioned against or flush with a vertical wall. In the particular example shown, drive surface 1274 extends at approximately 135° relative to a horizontal plane such that drive surface extends perpendicular to the plane containing prongs 928, 930. drive surface 1274 is movable between a loaded position or state (shown in FIGS. 26-28) and impelling position in which surface 1274 is engaging in driving impeller 922 and a discharge position (shown in FIGS. 19, 23, 24 and 25). Drive surface 1274 moves between the loaded position, the impelling position and the discharge position in a plain substantially parallel to the wall and in a direction non-parallel to the direction in which impeller 922 is impelled into the wall. Drive member 1268 does not need to project in front of wall hanging 20 which would otherwise obstruct the view of wall hanging 20 by a person hanging wall hanging 20 on the wall. In the particular example shown, drive bar 1268 is formed from a sufficiently hard material for driving impeller 922. In the embodiment shown, bar 1260 is formed from steel. In other embodiments, portions of bar 1268, other than drive surface 1274 may be from less hard materials.

Spring 1270 comprises a tension spring concentrically positioned within spring 1272 having a first end 1276 coupled to housing 1262 and a second end 1278 coupled to drive bar 1268 via fastener 1280. During loading of bar 1268, spring 1270 is extended so as to store energy for driving bar 1268 and impeller 922. As we described in greater detail hereafter, actuation of trigger mechanism 1208 discharges spring 1270 such that drive surface 1274 is driven in the direction indicated by arrow 1284 to move drive surface 1274 to the impelling position and to the position in which drive bar 1268 engages spring 1272 towards the end of its movement.

Spring 1272 comprises a compression spring concentrically positioned about spring 1270 proximate to end 1276. Spring 1272 has a first end fixedly coupled to housing 1262 and a second opposite end 1282 terminating at a location so as to initially engage drive member 1268 after drive member 1268 as substantially completed its downward stroke and has at least substantially driven wall support 914 (or in other wall support) into the wall. Spring 1272 absorbed forces from movement of drive member 1268 after the wall support 914 has been mounted into the wall to reduce vibration in impact forces that would otherwise be experienced by housing 1262 and the person holding device 1110. In other embodiments, other force or impact absorbing devices or members may be employed.

Loading mechanism 1206 comprises a mechanism configured to enable drive surface 1274 to be moved to the loaded position or state and to be temporarily retained in the loaded position until trigger mechanism 1208 is actuated. In the particular example shown, loading mechanism 1206 includes loading member 1286 and retaining mechanism 1288. Loading member comprises one or more structures configured to serve as a handle or surface against which a person may manually engage (or contact) and apply a force to load spring 1270 and to move drive surface 1274 to a loaded state.

Figure 21:
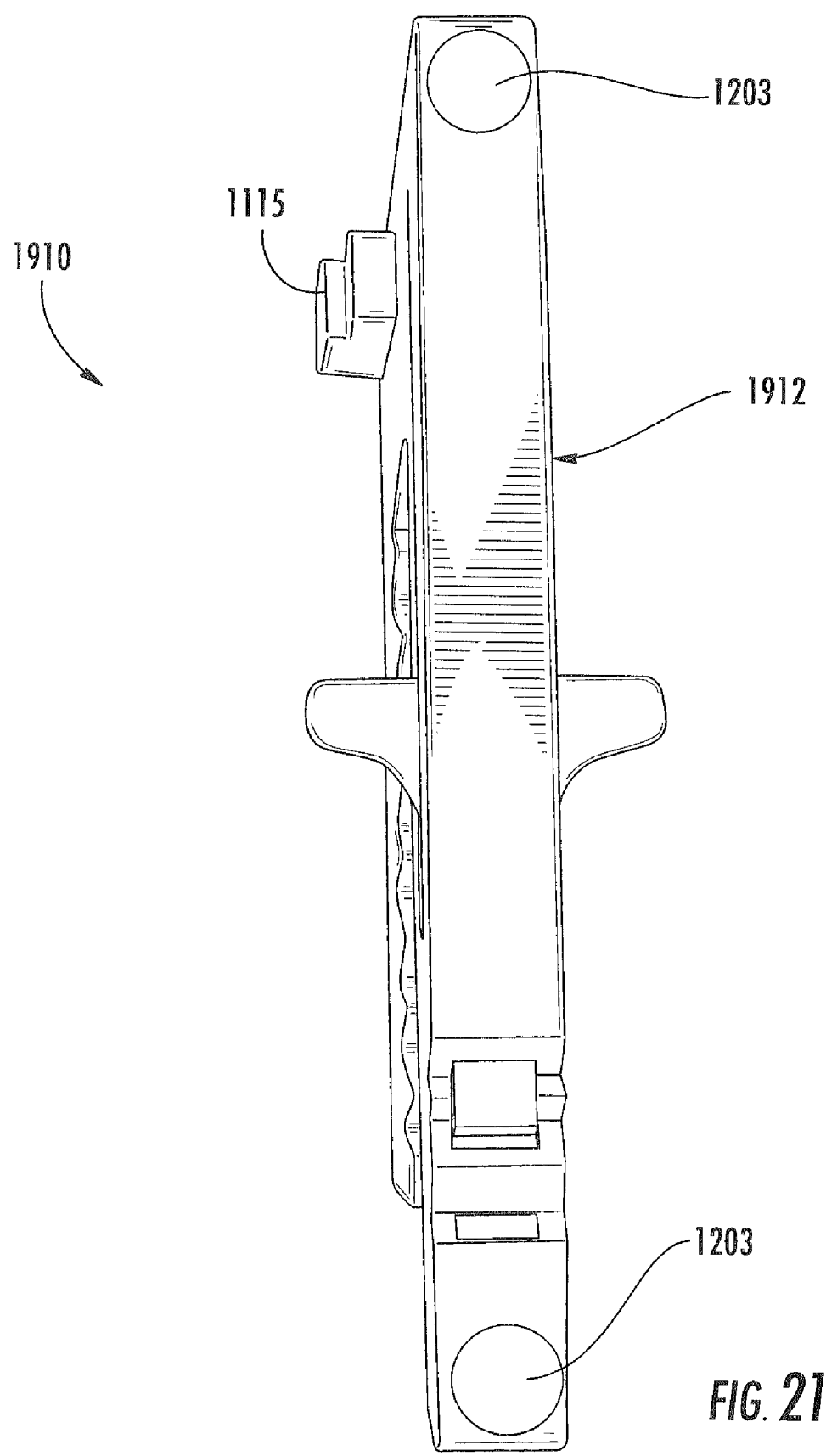
FIG. 21 is a front perspective view of the wall support mounting device of FIG. 19.

As shown by FIG. 21, loading member 1286 has oppositely extending portions 1287 that extended through opposing spaced sidewalls of housing 1262. Portions 1287 permit forces to be applied to spring 1270 from both sides of spring 1270 for a more symmetrical application of force to spring 1270. As a result, loading of spring 1270 is facilitated. In the particular example illustrated, each of portions 1287 are symmetrically shaped with respect to one another and symmetrically extend from housing 1262. In the example illustrated, each of portions 1287 includes a downwardly facing arcuate edge 989. Edges 989 provide a comfortable surface against which a person's hands or fingers may apply force to loading member 1286. In one embodiment, the opposing walls of housing 1262 are spaced from one another by a distant less than or equal to about 0.5 inches. As a result, forces or more directly transferred to spring 1270. In addition, portions 1287 may be simultaneously engaged and drawn by fingers of a person's hand. For example, in one embodiment, both portions 1287 may be simultaneously engaged and drawn by a person's middle and index fingers. Consequently, loading a spring 1270 is intuitive and may be performed with less force. In other embodiments, member 1286 may extend through only a single side.

Figure 19:
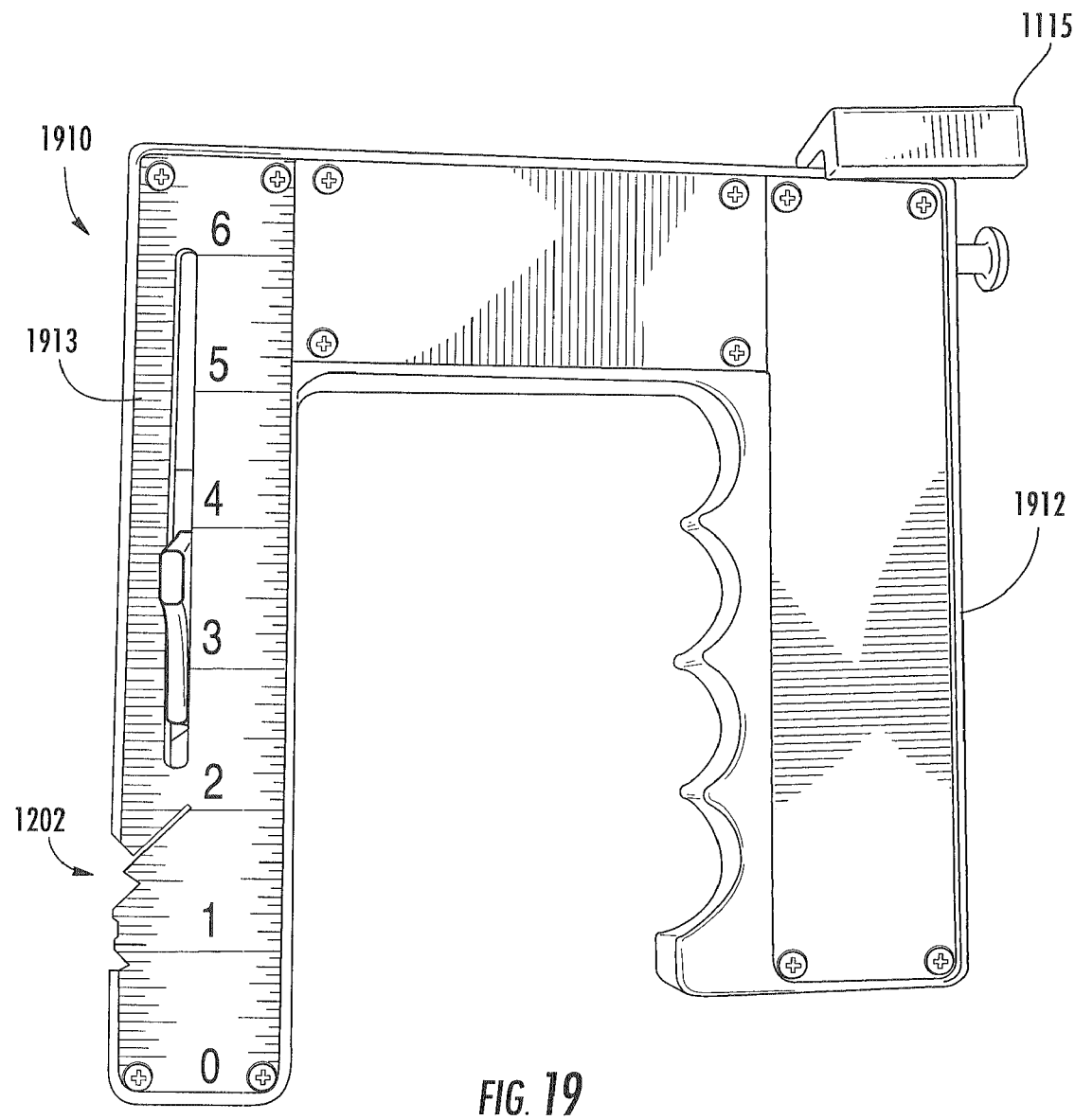
FIG. 19 is a left perspective view of another embodiment of the wall support mounting device of FIG. 1.
Figure 20:
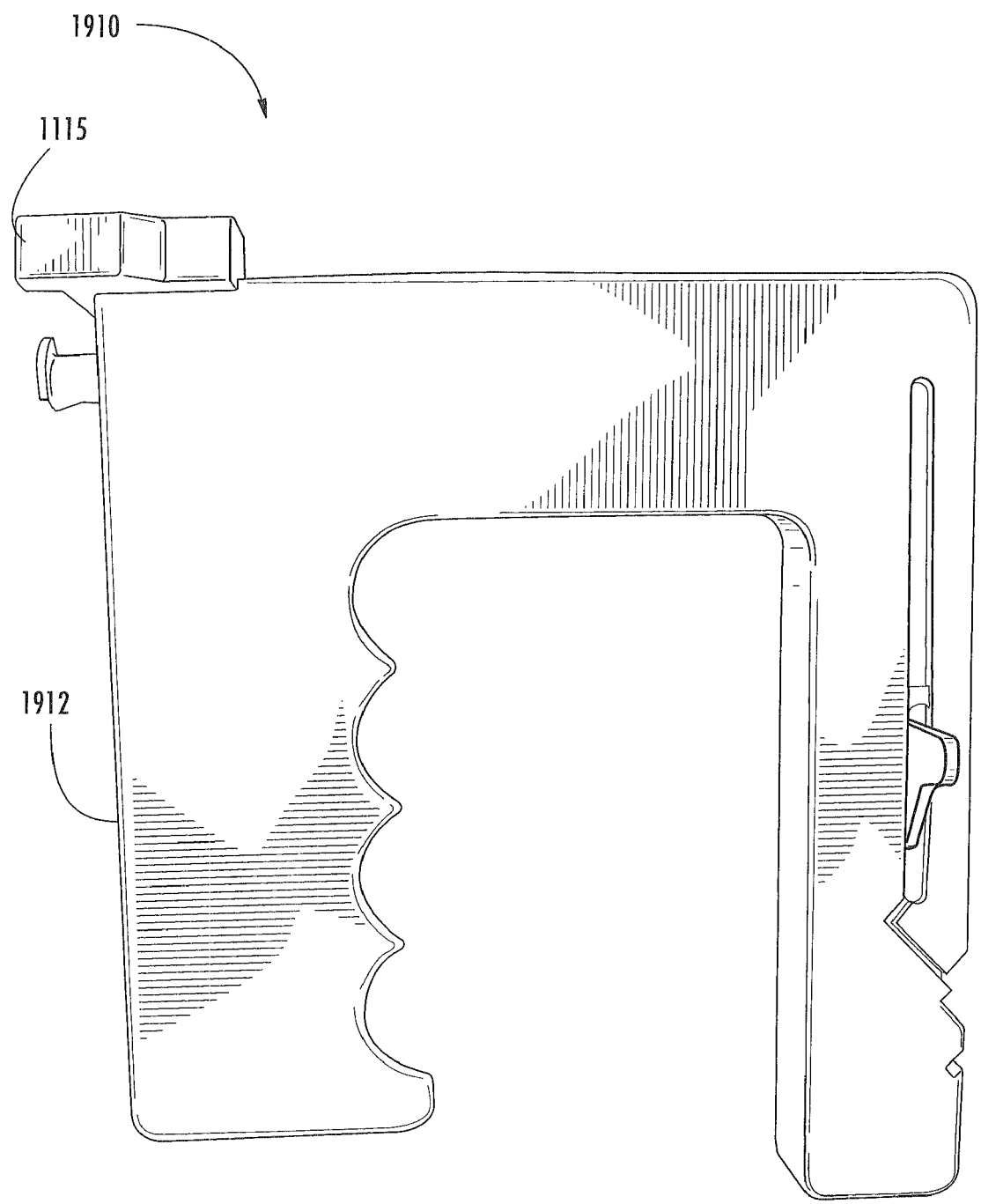
FIG. 20 is a right perspective view of the wall support mounting device of FIG. 19.
Figure 23:
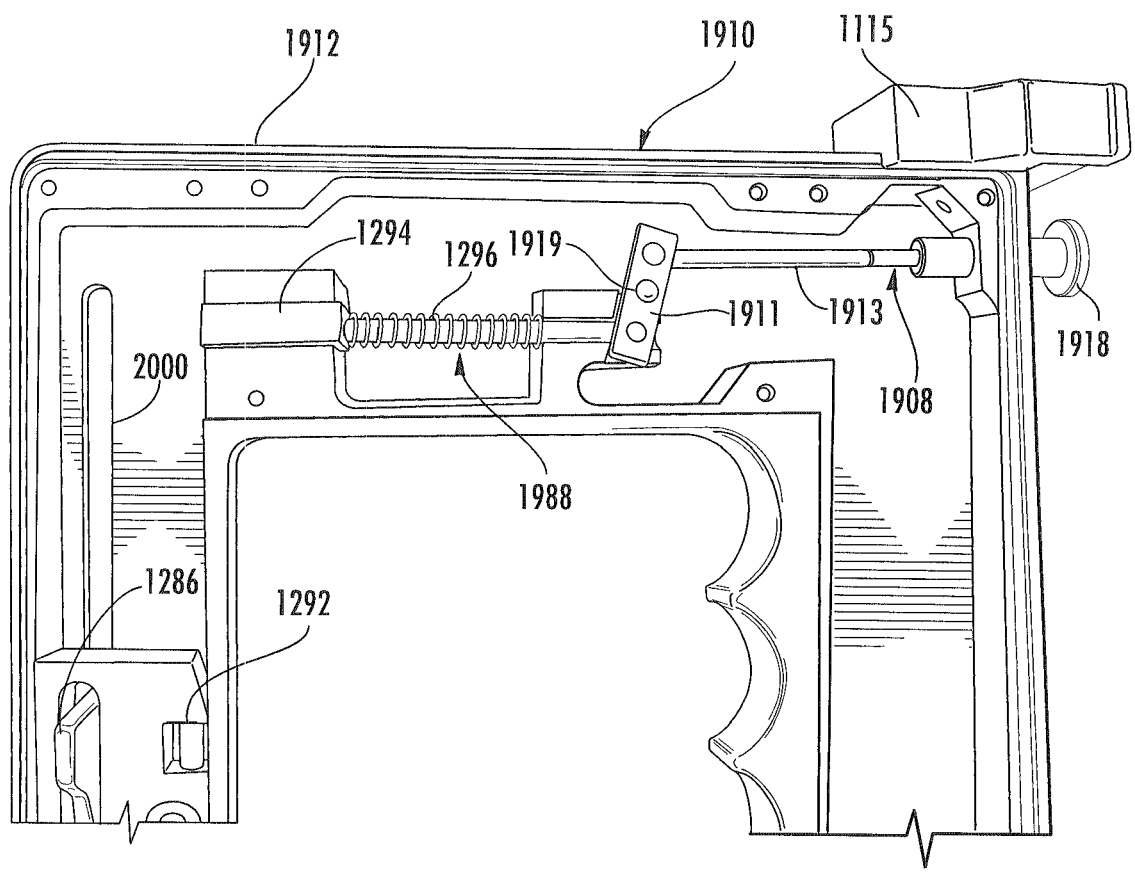
FIG. 23 is an enlarged fragmentary view of the wall support mounting device of FIG. 22.

As further shown by FIGS. 19, 21 and 23, loading member 1286 has exposed surfaces that are coupled to spring 1270 that are located between manually engageable trigger surface 1018 and a top of the device 1110 when spring 1270 and drive surface 1274 are loaded and after spring 1270 is unloaded and drive surface 974 is discharged. In the example illustrated, loading member 1286 is vertically located between trigger surface 1218 and the at least one retention surface provided by holder 1202 when spring 1270 and drive surface 1274 are loaded and after spring 1270 is unloaded and drive surface 1274 is discharged. As a result, loading mechanism 1206 and the loading member 1286 remain substantially contained within housing 1262 prior to loading, during loading and after discharging. Consequently, coupling unit 1112 operates in a more compact fashion.

Retaining mechanism 1288 is configured to releasably retain drive surface 1274 in the loaded position. Retaining mechanism 1288 generally includes catch 1292, retainer 1294 and bias member 1296. Catch 1292 comprises a surface along drive member 1268 configured to be engaged by retainer 1294 so as to retain drive surface 1274 in the loaded position. In the particular example shown, catch 1292 comprises a detent, cut out or notch extending into drive member 1268. In other embodiments, catch 1292 may comprise a pin, projection or other structure projecting from a side of drive member 1268.

Retainer 1294 comprises an elongate arm or bar slidably supported by housing 1262 for linear translation along an axis 1298. Retainer 1294 linearly translates between a retaining or loading position (shown in FIGS. 26-28) and a releasing or discharging position (shown in FIGS. 23-25). In the loaded position, retainer 1294 engages catch 1292 to retain drive surface 974 in the loaded position. In the discharged or withdrawn position, retainer 1294 is withdrawn from catch 1292, permitting spring 1270 to retract to drive surface 1274 towards spring 1272 and into engagement with a wall support supported by holder 1202.

Figure 10:
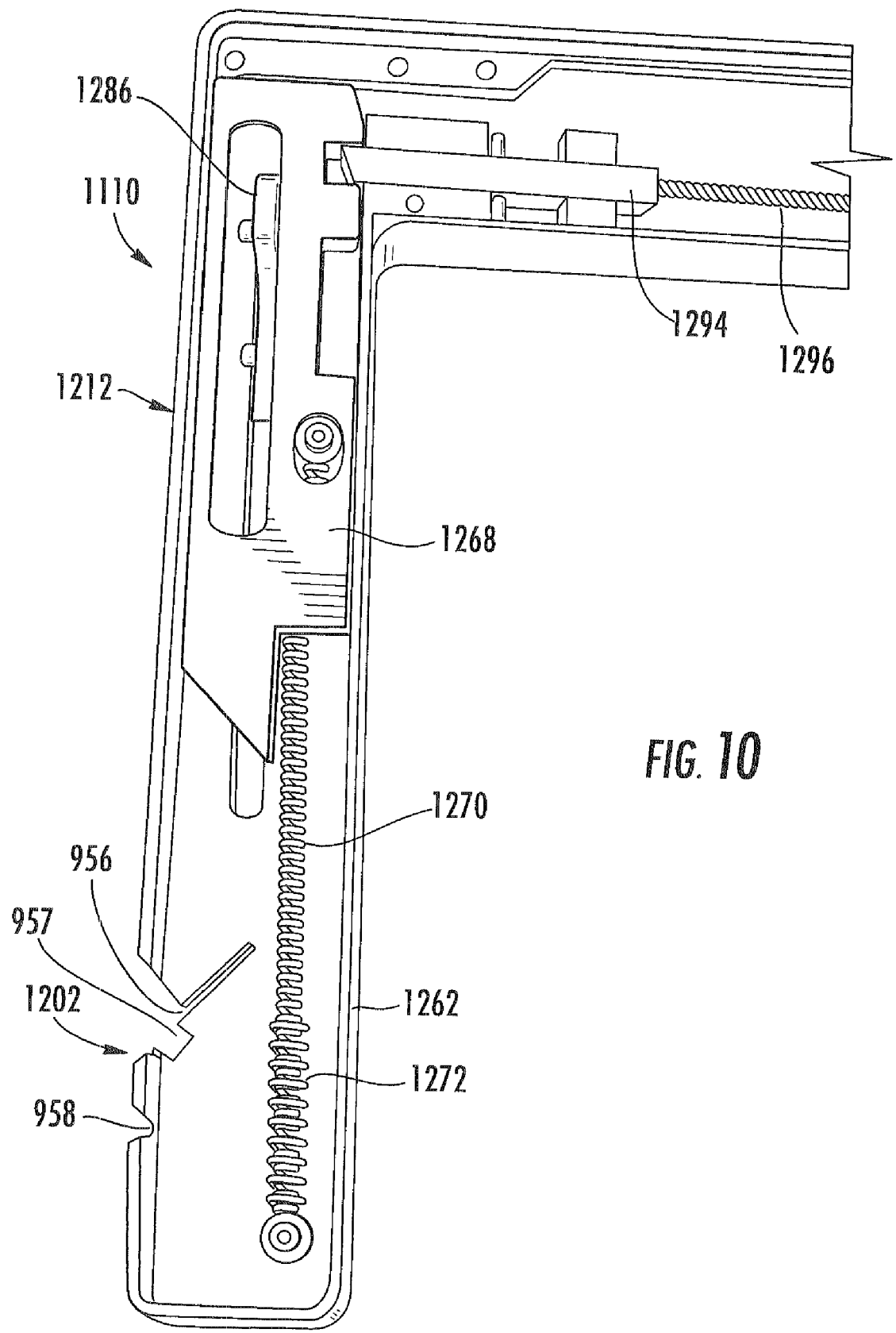
FIG. 10 is an enlarged fragmentary perspective view of a portion of the wall support mounting device of FIG. 7 in a loaded state according to an example embodiment.
Figure 11:
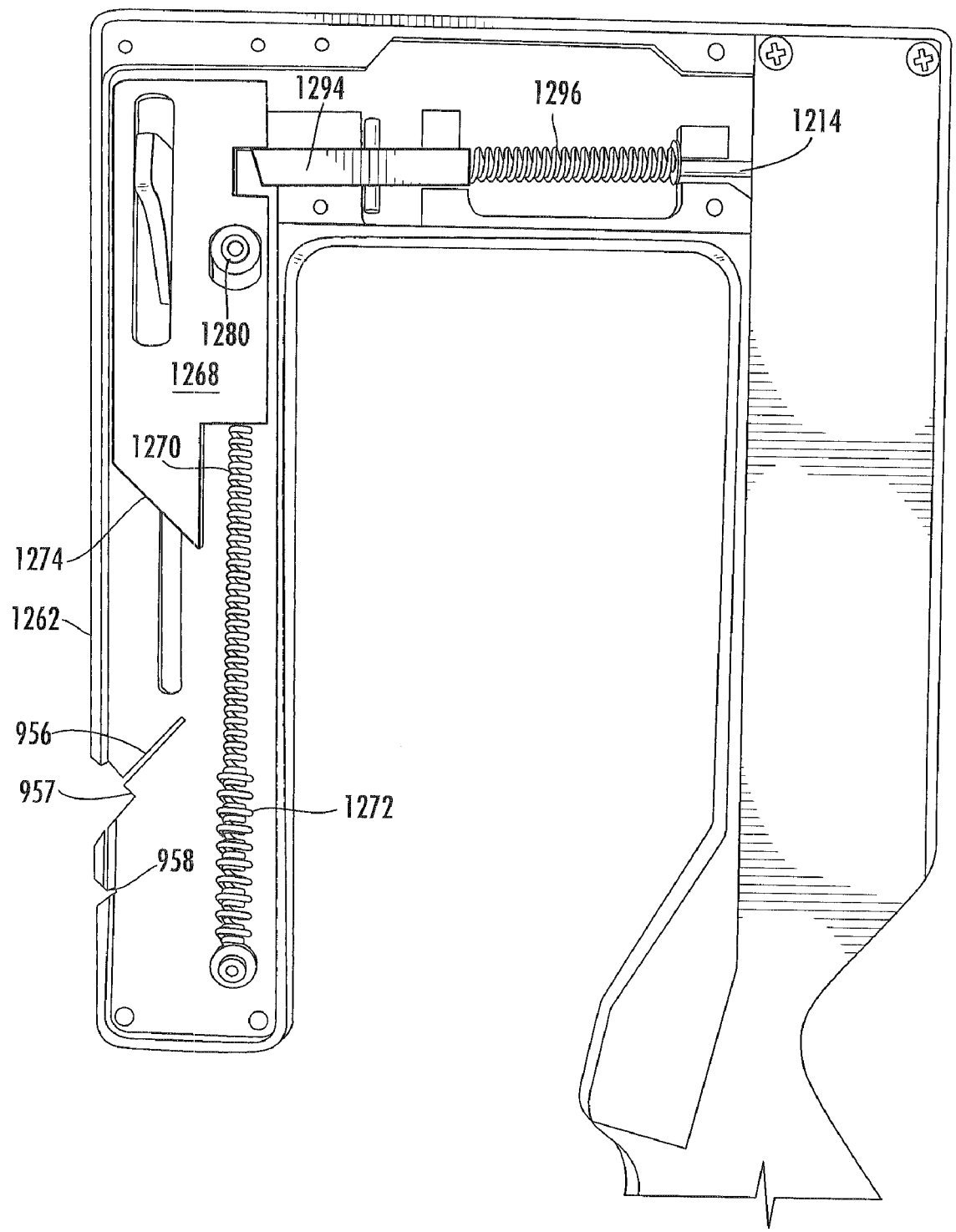
FIG. 11 is an enlarged fragmentary perspective view of the wall support mounting device of FIG. 7 in a loaded state according to an example embodiment.
Figure 12:
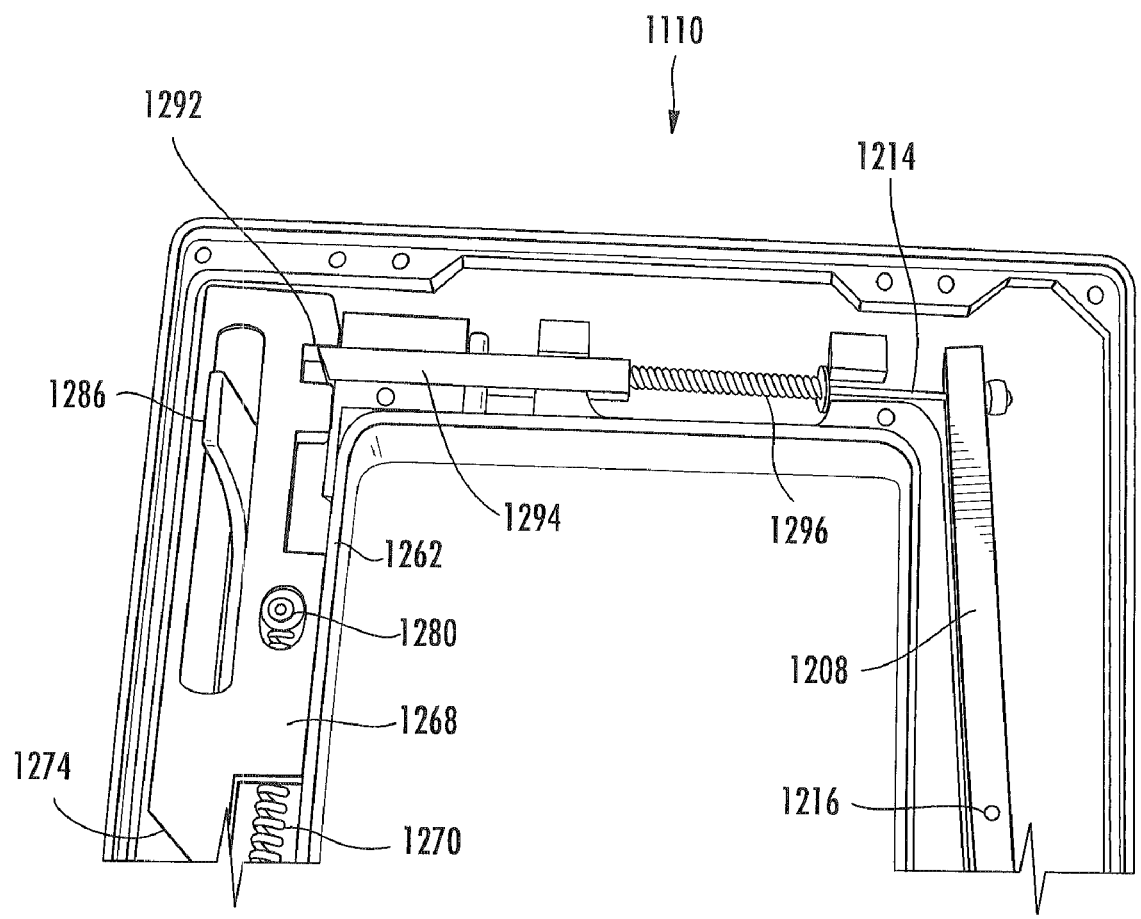
FIG. 12 is an enlarged fragmentary perspective view of the wall support mounting device of FIG. 7 according to an example embodiment.
Figure 26:
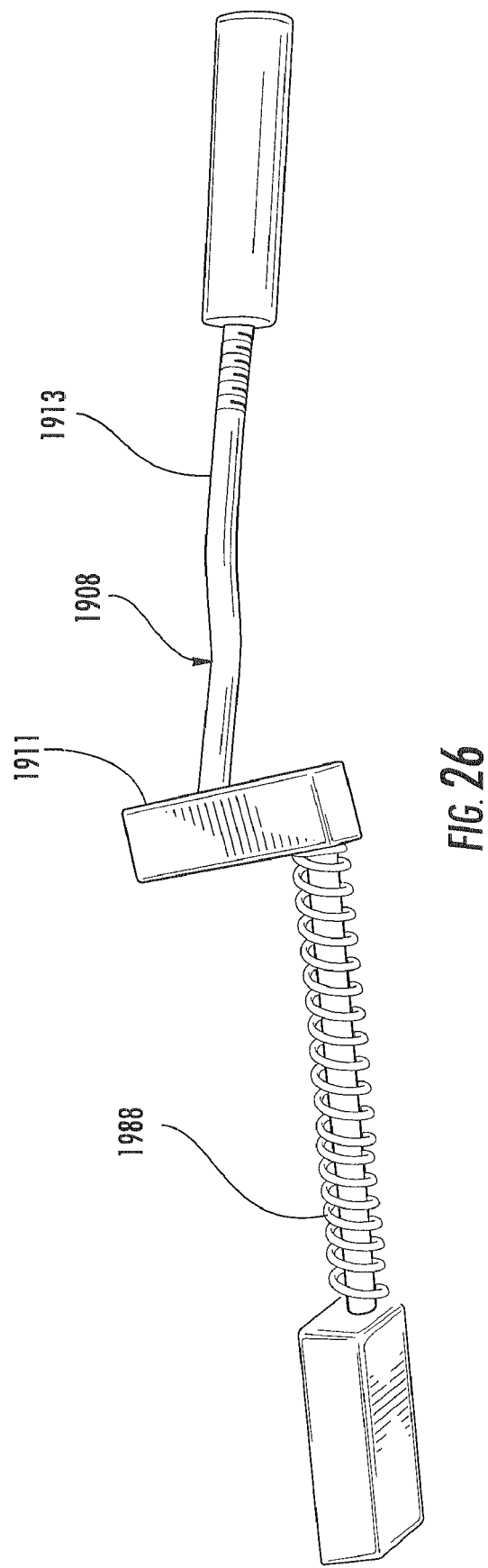
FIG. 26 is a perspective view a trigger mechanism of the wall support mounting device of FIG. 19.
Figure 27:
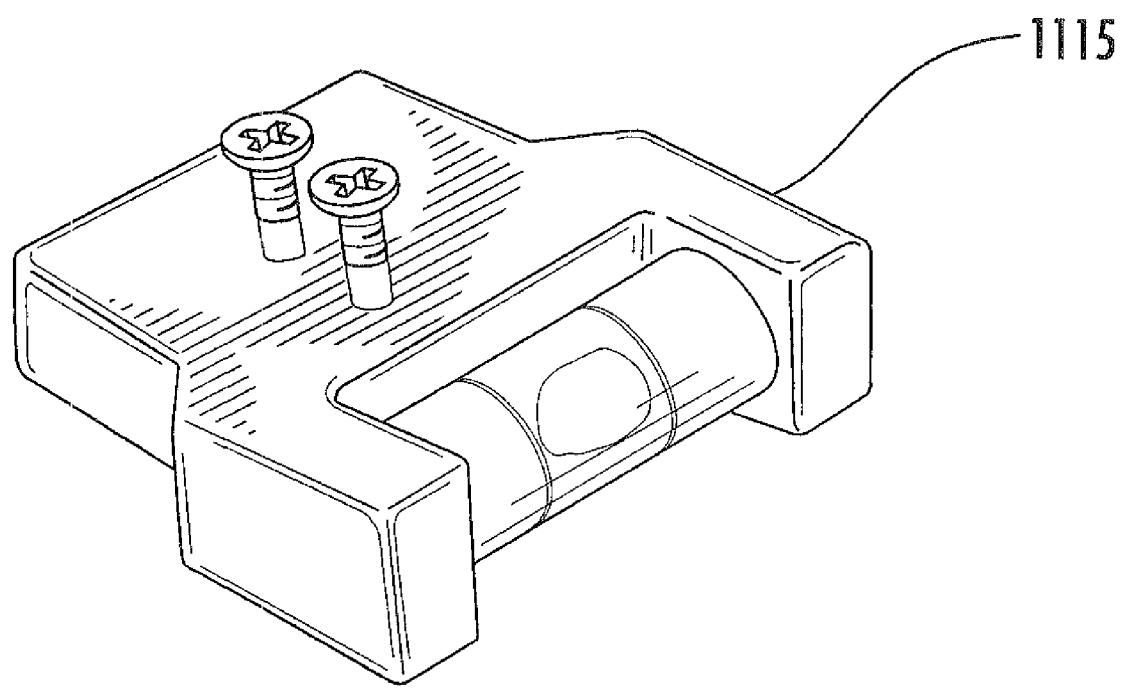
FIG. 27 is a perspective view of a level indicator of the wall support mounting device of FIG. 19.

Bias member 1296 resiliently biases retainer 1294 towards the retaining or loaded position as shown in FIG. 10. In the particular example shown, bias member 1296 comprises a compression spring coupled between retainer 1294 and housing 1262. Member 1296 enables catch 1292 to be moved from below retainer 1294 to above retainer 1294 as member 1296 is compressed. Once catch 1292 has received retainer 994 (as seen in FIG. 26), member 994 resiliently returns retainer 994 to the retaining position. In lieu of comprising a compression spring, bias mechanism 1296 may comprise other biasing structures such as a leaf spring, tension spring, or resilient material coupled between housing 1262 and retainer 1294.

Trigger mechanism 1208 comprises a mechanism configured to actuate retainer 1294 from the retaining or loading position to a releasing or discharged position. Trigger mechanism 1208 includes housing 1210, trigger 1212 and coupling member 1214.

Trigger 1212 comprises a member pivotally coupled to housing 1210 about axis 1216. Trigger 1212 includes a manually engageable and accessible actuation surface 1218 on a first side of axis 1216 and a working end 1220 on a second opposite side of axis 1216. Working end 1220 is coupled to retainer 1294 by coupling member 1214 which is illustrated as a wire. Because coupling member 1214 couples trigger 1212 to retainer 1294, bias member 1296 also resiliently biases trigger 1212 to towards an unactuated state. As shown by FIG. 23, trigger 1212 mechanism 1212 additionally includes bias member 1215 (shown as a compression spring) further resiliently biasing trigger surface 1218 towards the un-actuator or uncompressed state or position.

As shown by FIG. 23, in the particular example illustrated, trigger 1212 is coupled to coupling member 1214 by means of a hole or aperture through which trigger 1218 passes, wherein an axial end of coupling member 1214 has secured to it an enlarged head 1301. During pivoting of trigger 1218 about axis 1216, trigger 1218 engages head 1301 to linearly move coupling member 1214 and retainer 1294 along axis 1298. According to one embodiment, head 1301 is adjustably coupled to coupling member 1214. As a result, the axial positioning of head 1301 upon coupling member 1214 may be adjusted or varied to very the sensitivity of trigger mechanism 1208. To lower the sensitivity of trigger mechanism 1208, had 1301 may be adjustably moved along axis 1298 to the right (as seen in FIG. 23), permitting a greater degree of movement of trigger surface 1218 without any corresponding movement of coupling member 1214 or retainer 1294. To increase the sensitivity of trigger mechanism 1208, head 1301 may be linearly adjusted or moved to the left (as seen in FIG. 23) such that trigger 1212 engages head 1301 earlier in time upon depressment of trigger surface 1218. In one embodiment, head 1301 comprises a nut threaded onto exterior threads along coupling member 1214. In other embodiments, head 1301 may be adjustably positioned or coupled to coupling member 1214 in other fashions. In other embodiments, trigger 1212 may be fixedly connected to coupling member 1214 such that any movement of trigger 1212 automatically and immediately causes movement of coupling member 1214 and retainer 1294.

FIG. 19 illustrates trigger disabler 1209. Trigger disabler 1209 comprises one or more structures actuatable between the first disabling state inhibiting actuation of trigger mechanism 1208 and a second trigger enabling state permitting actuation of trigger mechanism 1208. As a result, inadvertent or accidental actuation of trigger mechanism 1208 and accidental firing of drive mechanism 1204 is reduced or eliminated. In the particular example illustrated, trigger disabler 1209 comprises a cover movable between a first position (shown in FIG. 1) inhibiting sufficient manual engagement with trigger surface 1218 to actuate trigger mechanism 1208 and a second position permitting sufficient manual engagement or contact with trigger surface 1218 to actuate trigger mechanism 1208. In the particular embodiment illustrated, the cover of trigger disabler 1209 includes one or more elongate interior channels or guides 1303 that slidably receive one or more projections or pins 1305 extending from housing 1210. The one or more channel 1303 and one or more pins 1305 slidably support the cover of disabler 1209 for slidable or linear translation between the first disabling position and the second enabling position. In the particular example illustrated, the cover includes a projecting flange or lip 1221 configured to permit a person to contact or engage an underside of cover 1209 with his or her thumb so as to manually slide or push the cover to access trigger surface 1218 and a substantially single motion without requiring the use of two hands or other fingers besides the person's thumb. As a result, disabler 1209 comprises a cost-effective disabling structure that may be easily moved for accessing trigger surface 1218 to use unit 1212.

Handle 1211 is coupled to housing 1210 and extends from housing 1210 generally below trigger surface throw 18. In the example illustrated, handle 1211 extends along an axis 1312 that is oblique to plain 1313 (extending into the page of FIG. 19) which extends along the front face 1315 of unit 1112. In the particular example illustrated, handle 1211 extends at an upward forwardly inclined angle. In the example illustrated, handle 1211 extends at an acute angle A relative to plane 1313. In one embodiment, angle A is between about 2° and about 15°, and nominally about 6°. As a result, unit 1112 is more ergonomic in nature.

In the particular embodiment illustrated, handle 1211 has a length of less than or equal to about 6 inches. In other embodiments, handle 1211 may extend at other orientations and may have other dimensions and shapes.

Figure 14:
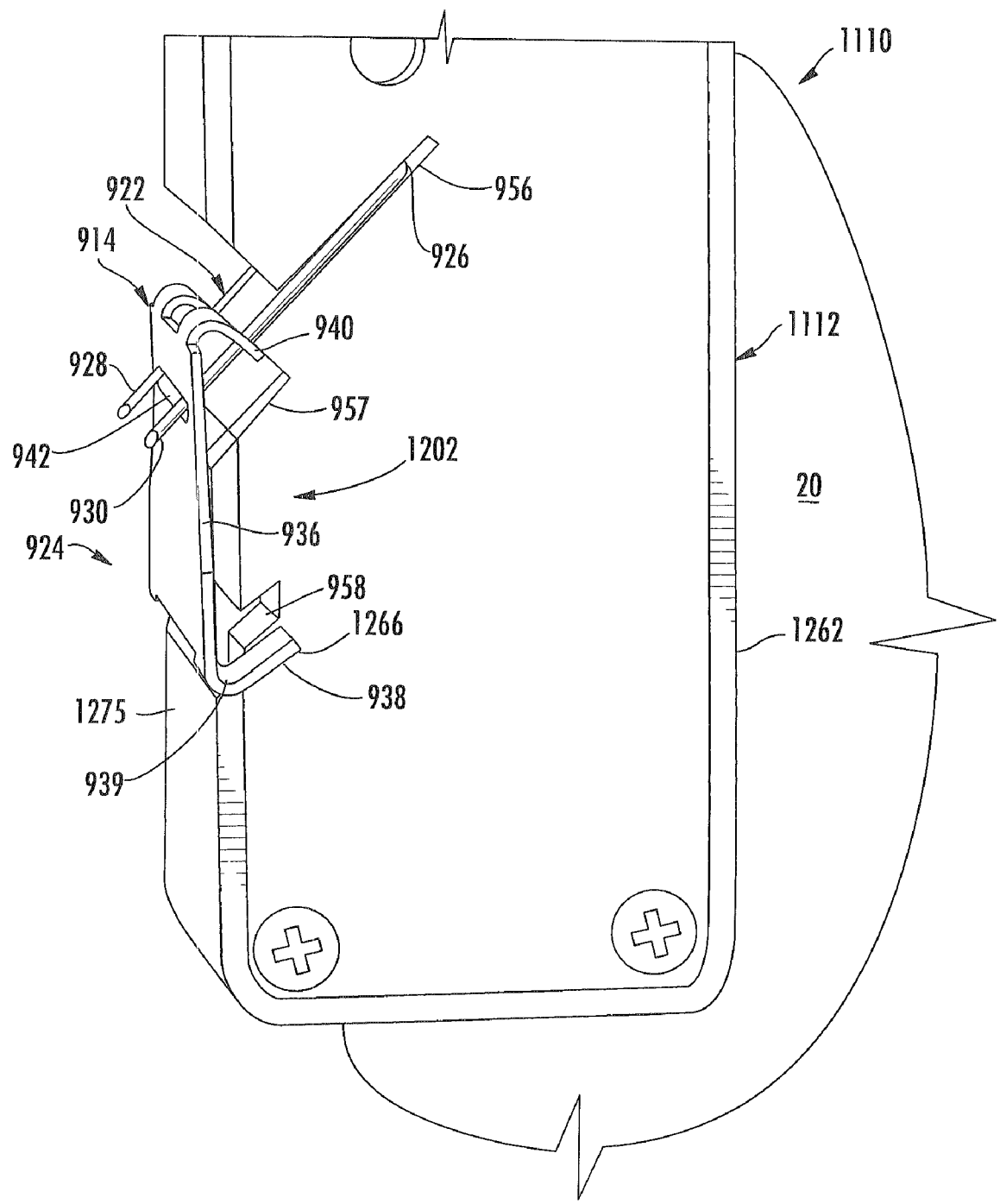
FIG. 14 is an enlarged fragmentary perspective view the wall support of FIG. 2 mounted to the wall support mounting device of FIG. 1.

FIGS. 13 and 14 illustrate one example method by which a wall support 914 may be mounted to a wall at a desired location. As shown in FIG. 13, a wall hanging 20 is hung from device 1110 with mounting portion 18 (shown as a wire) of the wall hanging 20 inserted into recess 958. As a result, a person is able to mentally note where the top of wall hanging 20 lies with respect to device 1110. In the example illustrated in FIG. 13, the top of wall hanging 20 extends across from location 1281. In particular mamas, the person may draw, scratch, indent or otherwise formed a marked 1282 corresponding to location 1281. Because recess 958 substantially corresponds to the position of hooks 938 when wall support 914 is attached to device 1110 during coupling of the wall support to the wall, when device 1110 is positioned against a wall to mount wall support 914 to the wall, location 1281 on device 1110 will also indicate where the top of walking 20 be located along the same wall when subsequently hung from wall support 914.

As shown in FIG. 14, once location 1281 has been noted, wall hanging 20 is removed from device 1110. Thereafter, wall support 914 is mounted to device 1110 and holder 1202. Prior to such mounting, drive member 1268 and the spring 1270 are loaded as described above. With drive member 1268 loaded and with wall support 914 mounted to device 1110, device 1110 is positioned against the wall. Location 1281 is vertically positioned across from the wall at the desired height for the top of the wall hanging 20. At this location, trigger surface 1218 is actuated discharging drive member 1268 to drive impeller 922 into the wall support 914 to the wall. Device 1110 is then removed from the mountain wall support 914 and lying 20 is hung from the mountain wall support 914 by positioning the wire or mounting portion 18 across hooks 938.

Figures 15, 15A:
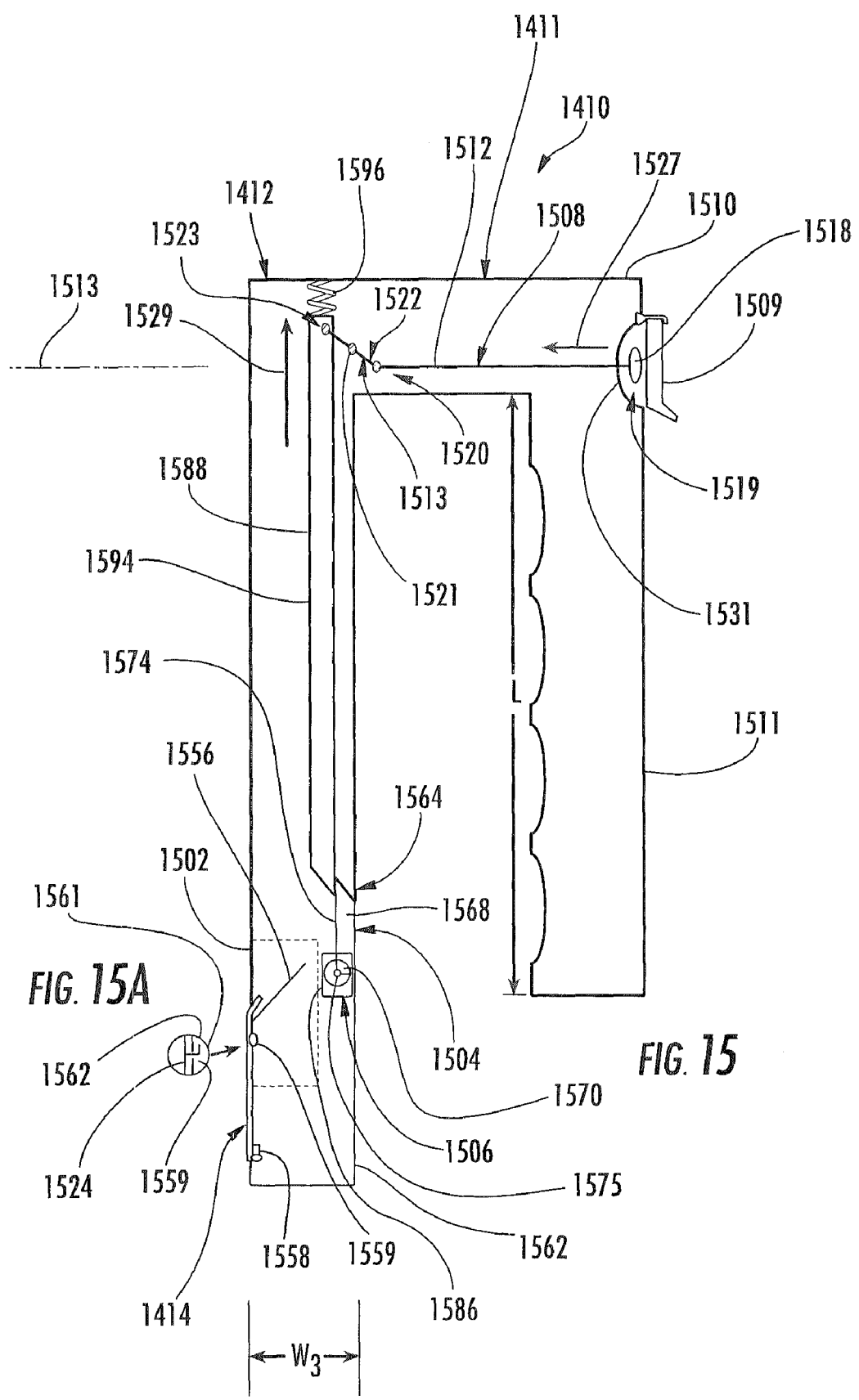
FIG. 15 is a schematic illustration of another embodiment of the wall support mounting device of FIG. 1 according to example embodiment.
FIG. 15A is an enlarged view of a portion of the wall support mounting device of FIG. 15.

FIG. 15 schematically illustrates wall support mounting device 1410, another embodiment of wall support mounting device 1110. Like device 910, device 1410 is configured to couple a wall support to a wall. Like device 910, device 1410 is specifically configured to drive a wall support into a wall at an angle oblique to the wall. In the example illustrated, device 1410 is configured to couple a wall support, such as wall support 914 or other wall support to a wall. In the example shown, device 1410 is configured to impel a portion of the wall support into a wall.

Device 1410 includes coupling unit 1412 and level indicator 1115 (shown described above with respect to device 1110. Coupling unit 1412 includes wall support holder 1502, drive unit 1504, load a mechanism 1506, trigger mechanism 1508 and trigger disabler 1509. Wall support holder 1502 comprises a portion of coupling unit 1412 which includes at least one retention surface configured to temporarily and releasably retain a wall support 1414 in place as drive mechanism 1504 drives the wall support 1414 into the wall or other wise couples the wall support to the wall. Wall support holder 1502 generally includes a channel 1556, recess 1558 and support aperture 1559. Channel 1556 and recess 1558 are substantially similar to channel 956 and recess 958 described above. Support aperture 1559 comprises an opening extending through a front wall of housing 1562. Aperture 1559 is sized so as to receive a catch or hook 1561 extending from hanger 1524 which resiliently flexes during insertion through aperture 1559. Hanger 1524 is similar to hanger 924 in substantially all other respects. Hook 1561 projects behind the front wall of housing 1562 to assist in retaining hanger 1524 adjacent a remainder of coupling unit 1412 until the impeller 922 associated with wall support 1414 is mounted to a wall. As will be described hereafter, during mounting of wall support 1414 to wall, hook 1561 is driven through aperture 1559 to release hanger 1524 from coupling unit 1412 or is alternatively broken off or otherwise separated from main portion 936 from which hook 1561 projects.

As further shown by FIG. 15, in the particular example illustrated, wall support holder 1502 is releasably or removably coupled to a remainder of coupling unit 412. In one embodiment, holder 1502 is modular in nature or is in the form of a holder "cartridge" configured to be releasably amounted to coupling unit 1412. As a result, holder 1502 may be easily removed from coupling unit 412 for repair or replacement. In particular embodiments, device 1410 may include a plurality of distinct wall support holder cartridges which may be interchangeably mounted to coupling unit 412, wherein each wall support holder module or cartridge is configured to releasably support a different wall support relative to coupling unit 1412 while the wall support is being coupled to a wall. As a result, different wall support holders may be used with coupling unit 1412 two mount or couple different wall supports having different features comic characteristics or it manages, to a wall. Thus, the interchangeability of different wall support holder 1502 to provide device 1410 with enhanced versatility to meet different wall hanging mounting needs.

In one embodiment, such wall support holder cartridges or modules may be configured to snap into place with respect to coupling unit 1412, eliminating or reducing the need for tools. In another embodiment, such wall support holders may be removably connected to coupling unit 1412 by one or more fasteners. In yet other embodiments, this modular or cartridge nature of wall support holder 1502 may be omitted, wherein support holder 1502 is permanently provided as part of coupling unit 1412. Although the cartridge of wall support holder 1502 is illustrated as omitting recess 1558 (which is attention identical to recess 958 described above), in other embodiments, recess 1558 may also be incorporated as part of the cartridge providing the remaining elements of holder 1502. In Drive mechanism 1504 comprises a mechanism configured to drive or impel impeller 922 associated with wall support 914 or an impeller associate with another wall support into the wall. Drive mechanism 1504 includes housing 1562 and a drive unit 1564. Housing 1562 has a width W₃ configured to extend between a back surface of wall hanging 20 and the wall while wall support 1414 is positioned against the wall and while mounting portion 18 extends from morning 20 into engagement with wall support 1414.

Drive unit 1564 is essentially contained within housing 1562 and engages impeller 922 (shown in FIG. 3) to drive impeller 922 of us is secure hanger 1524 to a wall. Drive unit 1564 includes drive member 1568 and spring 1570. Drive member 1568 extends within housing 1562 and generally comprises a pivotable panel, door or bar having a drive surface 1574 that comprises a surface configured to engage head 926 of impeller 922 (shown in FIG. 2) so as to exert a force upon impeller 922 to drive impeller 922 into a wall). Drive member 1568 pivots about axis 1575 between a loaded position (shown in FIG. 10), and impelling position in which drive surface 1574 is in engagement with impeller 922 and driving impeller 922 and a discharged position in which drive member 1568 has rotated past channel 1556. In one embodiment, drive member 1568 pivots through a proximally 180 degrees during a stroke. In one embodiment, drive their 1568 may rotate until engaging a force absorbing member such as a spring or rubber bumper (not shown). In one embodiment, drive member 1568 is formed from steel. In other embodiments, portions of drive member 1568 may be formed from other materials.

Spring 1570 comprises a spring configured to load drive member 1568 and to drive member 1568 with a sufficient force so as to drive impeller 922 into a wall. In one embodiment, spring 1570 comprises a pre-loaded torsion spring configured to rotationally drive member 1568 about axis 1575. In other embodiments, spring 1570 may comprise a compression spring, a tension spring or other resiliently biasing mechanisms appropriately positioned relative to drive member 1568 and housing 1562 so as to drive or move drive member 1568 about axis 1575.

Loading mechanism 1506 comprising mechanism configured to enable drive member 1568 and its drive surface 1574 to be moved to the loaded position and to be temporally retained in the loaded position until trigger mechanism 1508 is actuated. In the particular example illustrated, loading mechanism 1506 includes a loading member 1586 and retaining mechanism 1588. Loading member 1586 comprises one or more structures configured to serve as a handle or surface against which a person may manually engage (or contact) and apply a force to load spring 1570 so as to move drive surface 1574 to be loaded state. In one embodiment, loading member 1586 (schematically shown in FIG. 29) may comprise a lever coupled to an extending from drive member 1568 that is configured to be manually gripped and rotated about axis 1506 to wind the torsion spring 1570. Such an embodiment, load member 1586 may comprise a pair of tabs or projections extending through arcuate slots in opposite side walls of housing 1562. In other embodiments, loading member 1586 may have other configurations.

Retaining mechanism 1588 is configured to releasably retain drive surface 1574 in the loaded position or steak. Retaining mechanism 1588 includes retainer 1594 and bias member 1596. Retainer 1594 comprises an elongated arm linearly movable or translatable along a substantially vertical axis between a retaining or loading position (shown in FIG. 15) and a releasing are discharged position in which a lower end of retainer 1594 is elevated above an uppermost portion of drive member 1568. In the loaded position, retainer 1594 inhibits rotation of drive member 1568 in a counter-clockwise direction (as seen in FIG. 15). In the discharged position, retainer 1594 is withdrawn from drive member 1568, permitting drive member 1568 to rotate in the counter-clockwise direction under the force applied by spring 1570.

Bias member 1596 resiliently biases retainer 1594 towards the retaining or loaded position shown FIG. 15. In particular example illustrated, bias member 1596 comprises a compression spring coupled between retainer 1594 and housing 1562. Member 1596 enables drive member 1568 to be rotated in a clockwise direction during loading from one side of retainer 1594 to an opposite side of retainer 1594 as member 1596 is compressed. Once drive member 1568 has moved past retainer 1594, member 1596 resiliently returns retainer 1594 to the retaining position. As shown by FIG. 15, in the particular example illustrated, drive member 1568 and retainer 1594 each have complementary tapered, sloped, ramped or angled surfaces such that as drive member 1568 is rotated in the clockwise direction, drive member 1568 drives or lifts retainer 1594 against bias member 1596. In other embodiments, in lieu of comprising a compression spring, bias member 1596 may comprise other biasing structures such as a leaf spring, tension spring are resilient material coupled between housing 1562 and retainer 1594.

Trigger mechanism 1508 comprising mechanism configured to actuate retainer 1594 from the retaining or loaded position to the released or discharged position. Trigger mechanism 1508 includes housing 1510, trigger 1512 and link 1513. Housing 1510 comprises a structure coupled to housing 1562 and configured to enclose or shield portions of trigger 1512. Housing 1510 further guides movement of trigger 1512.

Trigger 1512 comprises a member slidably or linearly translatable along access 1513. Trigger 1512 includes a manually engageable and accessible actuation surface 1518 on a first and 1519 and a working end 1520 pivotally connected to link 1513. Link 1513 comprises a specially rigid member pivotally connected to housing 1510 a rotation about axis 1521. Link 1513 has a first end 1522 pivotally connected to end 1520 of trigger 1512 and a second end 1523 or pivotally connected to retainer 1594. As a result, depression of trigger service 1518 moves trigger 1512 and the direction indicated by arrow 1527. This results in linkage 1513 rotating in a clockwise direction to left retainer 1594 in a direction indicated by arrow 1529 against the bias force applied by bias member 1596. As a result, retainer 1594 is lifted or raised, permitting spring 1570 to drive drive member 1568 into engage with the wall support held by holder 1502. Prior to depressment of trigger surface 1518, bias member 1596 resiliently biases surface 1518 to an unactuated or extended state.

Trigger disabler 1509 is substantially similar to figure disabler 1009 described above with respect to device 910. Like disabler 1009, disabler 1509 is configured to be actuator will between a first disabling state inhibiting actuation of trigger mechanism 1508 and a second trigger enabling state permitting actuation of trigger mechanism 1508. As shown by FIG. 15, inadvertent or accidental actuation of trigger mechanism 1508 is further inhibited by locating trigger surface 1518 in a recess or a void 1531. In other embodiments, trigger service 1518 may not be located within a void and/or disabler 1509 may be omitted.

Figure 29:
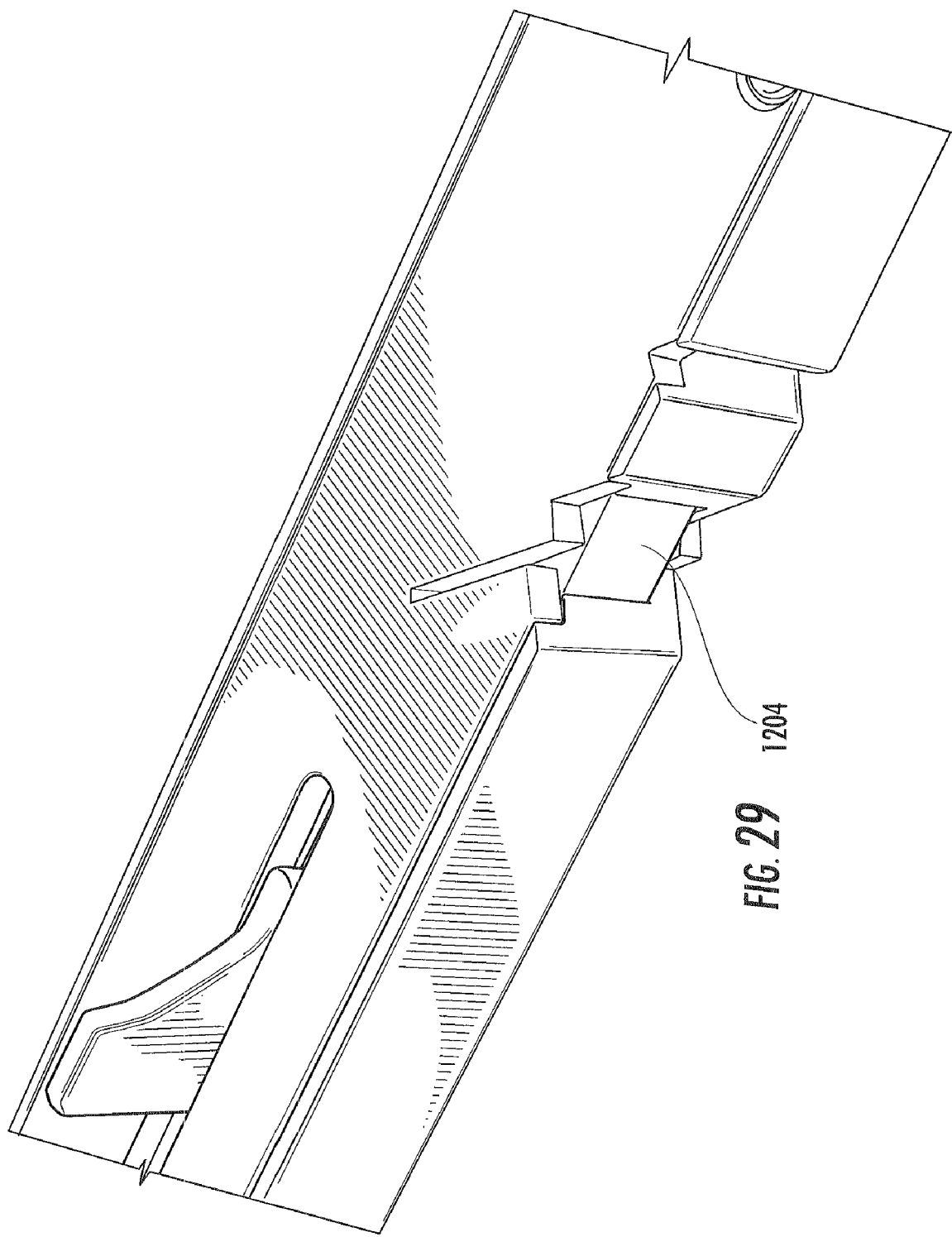
FIG. 29 is a fragmentary perspective view of the wall support mounting device of FIG. 19 in a fired or unloaded state.

Like wall support mounting device 1110, wall support mounting device 1410 extends over a wall hanging. As a result, wall support mounting device 1410 is able to accommodate a larger variety of differently sized wall hangings. In addition, wall support mounting device 1410 may be more compact in size. As shown by FIG. 29, device 1410 has trigger surface 1518 proximate to a top of the device horizontally across from the horizontal portion of device 1110 spacing handle portion 1511 from the vertical leg of housing 1562 containing drive member 1568 and having face 1502. As a result, handle portion 1511 may be located closer to a top 1411 of device 1410, and enabling handle portion 1511 to be shorter in length. In the example illustrated, handle portion 1511 has a length L of no greater than about 6 inches, a length sufficient to accommodate most hands. Because handle portion 1511 and trigger surface 1518 are located in close proximity to a top of device 1410, device 1410 is more compact. Although wall support holder 1502 has been illustrated and described as a cartridge or module for use with wall support mounting device 1410, wall support mounting device 1502 may additionally be incorporated as part of either wall support mounting device 1110. Likewise, in particular embodiments, wall support 1414 may also be utilized with devices 910 or 1110.

Figure 16:
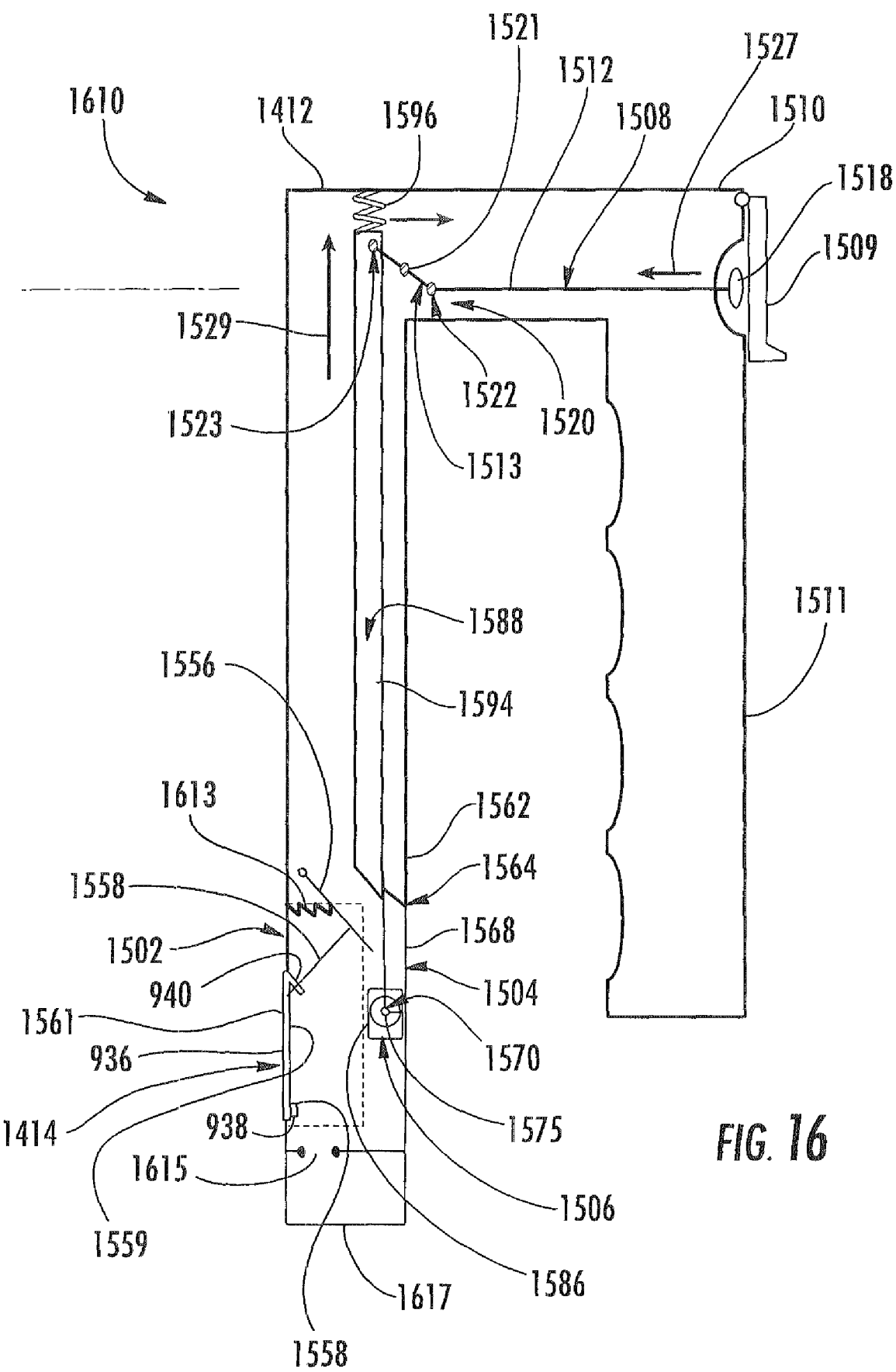
FIG. 16 is a schematic illustration of another embodiment of the wall support mounting device of FIG. 1 according to an example embodiment.

FIG. 16 schematically illustrates wall support mounting device 1610, another embodiment of wall support mounting device 1110. Wall support mounting device 1610 is similar to wall support mounting device 1410 (shown and described with respect to FIG. 29) except that wall support mounting device 1610 additionally includes spring 1613, opening 1615 and collection container 1617. Those remaining elements of device 1610 which correspond to elements of device 1410 are numbered similarly.

As shown by FIG. 16, spring 1613 resiliently biases paddle or door 1556 towards front face 1502. Spring 1613 enables differently sized fasteners of different wall supports to be used while reducing the likelihood that door 1556 will be swung past a top of drive member 1568 during loading of the wall support.

In the particular example illustrated, spring 1616 comprises a tension spring. In other embodiments, spring 1616 may comprise a torsion spring or a compression spring a appropriately repositioned with respect to door 1556 and housing 1562 to achieve the noted function. In other embodiments, housing 1562 may include internal stops preventing door 1556 from being swung too far past drive member 1568.

Opening 1615 comprises an opening extending within housing 1562 below holder 1502. Opening 1615 permit broken off hooks 1559 to be discharged from housing 1562. In the example illustrated, such broken off hooks pass through opening 1615 into collection container 1617.

Collection container 1617 comprises a receptacle below opening 1615 configured to receive and contain broken off hooks 1559. In the example illustrated, container 1617 is removably attached to housing 1562. As a result, container 1617 may be separated and emptied or disposed of with a new empty container 1617 being subsequently attached to housing 1562. In other embodiments, container 1617 may be omitted.

FIG. 17 is a side elevational view of wall support mounting device 1710, a particular embodiment of wall support mounting device 1610. Wall support mounting device 1710 is identical to wall support mounting device 1610 except that wall support mounting device 1710 additionally includes position assist 1713. Position assist 1713 comprises a structure or mechanism configured assist a person in estimating the relative positioning of a wall hanging supported by a wall support on the wall prior to actually coupling the wall support to the wall and prior to actually hanging or supporting the wall hanging on the wall support. In particular, position assist 1713 allows a person to form a marked or locate a pre-existing mark at a location on device 1710 that corresponds to a particular portion of the wall hanging to be mounted such as the top of the wall hanging, relative to the location oh the wall support. For example, the top of a wall hanging may vertically extend a predetermined distance above the mounting portion of the wall hanging, such as the top of the wire of the mounting portion when hung. Position assist 1713 enables a person to hang the wall hanging from device 1710 as if a wall hanging were being supported by the wall support, whereby position assist 1713 enables a person to mark the location of the top of the wall hanging to assist a person in subsequently determining layer device 1710 and should be vertically located along the wall when coupling the wall support to the wall to ensure that the top of the wall hanging is at a desired location.

In the particular example illustrated, position assist 1713 comprises a movable marker 1720 configured to be located at a multitude of positions along device 1710 and along the wall in which the wall support is to be mounted. According to one embodiment, marker 1720 is slidably attached to device 1710 for movement in the directions indicated by 1722. In one embodiment come marker 1720 includes a T-shaped tongue captured with in an elongate groove or slot 1724, facilitating sliding movement of marker 1720. In another embodiment, marker 1720 may be magnetically and movably attached to device 1710. In yet other embodiments, marker 1720 may be movably attached to or slidable along device 1710 in other manners.

FIG. 18 is a side elevation of you of wall support mounting device 1810, another embodiment of wall support mounting device 1710. Wall support mounting device 1810 is similar to wall support mounting device 1710 except that wall support mounting device 1810 includes position assist 1813 in place of position assist 1713. Position assist 1813 comprises a panel 1815 coupled to device 1810 and including a plurality of incremental marks 1820 extending along access 1824 so as to extend along a wall when face 1502 is position against the wall. Marks 1820 enable a person to associate one of marks 1820 with a particular portion of the wall hanging, such as the top of the wall hanging, and the use of the identified mark later when positioning device 1810 against the wall such that the wall support will be mounted to the wall at a location to achieve a desired positioning of the noted portion of the wall hanging, such as the top of the wall hanging, along the wall.

According to one embodiment, panel 1815 is removably attached to device 1810 by a releasable adhesive, by removal fasteners, by snaps, by magnetics or in other manners. In yet other embodiments, panel 1815 may be permanently secured to device 1810. In yet other embodiments, marks 1820 may be directly provided on device 1810.

In one embodiment, panel 1815 may itself have a dry erasable surface 1822, such as a dry erasable board, white board or high-gloss markable board, configured to be marked with a dry erasable marker so as to enable a person to form the mark on panel 1815 corresponding to a selected portion of the wall hanging, such as the top of the wall hanging. In such an embodiment, panel 1815 may also include marks 1820 or may omit marks 1820. Panel 1815 may be removably coupled to device 1810 or may be permanently provided as part of device 1810.

With position assist 1813, the wall support mounting device 1810 is better suited for mounting a wall support, such as wall support 914, to wall at a location such that the subsequently mounted wall hanging will also be at a desired location. In use, a person would first mount or hanging the wall hanging to be hung on device 1810. The wall hanging may be hung from device 1810 such that the wall hanging extends between handled portion 1511 and spaced 1502 or such that the wall hanging extends in front of oral long face 1502.

According to one example embodiment, the person would hang the wire of the wall hanging from recess 958. Although recess 958 is illustrated as being located along face 1502, recess 958 may alternatively be located along a rear face 1503 at a vertical location corresponding to the vertical positioning of hooks 938 of wall support 914 or corresponding wall hanging suspending structures of other wall supports. Because recess 958 corresponds to or is in close proximity with the vertical location of hooks 938 (shown in FIG. 3) of wall support 914 when the wall support 914 is being mounted to the wall by device 1810, the top of the wall hanging now hung from device 1810 will be spaced from the wall support as if the wall hanging were hung from the wall support. At this time, the person may identify one of marks 1820 corresponding to a top of the wall hanging or some other particular location on the wall hanging. The person may also or alternatively form a marked upon panel 1815 at a location that corresponds to the top of the wall hanging or some other location on the wall hanging. Alternatively, if device 1710 is being used in place of device 1810, the person may slide or otherwise move marker 1720 to a location corresponding to the top of the wall hanging or some other location on the wall hanging.

Once mark 1820 has been identified, once a mark has been formed upon panel 1815 or once marker 1720 has been properly located, the wall hanging is removed from device 1810 that the wall hanging is not supported by either the wall support or device 1810. Thereafter, device 1810 may be loaded by loading spring 1570 with load mechanism 1586 (shown in FIG. 16). The wall support, such as wall support 914, may be positioned and attached to device 1810. For example, in impeller 922 may be positioned within recess 1556 with hooks 938 wrapping about sides of device 1810. Once the wall support has been positioned on device 1810, device 1810 may be positioned against the wall. The vertical positioning of device 1810 relative to the wall may be selected using the identified mark 1820, the formed mark or the located marker 1720 to increase the likelihood that the subsequently mounted wall hanging will be located at desired vertical location. In particular, device 1810 is positioned such that the identified mark 1820, the formed mark or the located marker 1720 are vertically located along the wall at the same location where the person desires the top of the wall hanging (or other portion of the wall hanging) to be located. Once device 1810 has been properly positioned, trigger surface 1518 is actuated to unload the spring such as the spring drives drive member 1568 (shown in FIG. 16) to couple the wall support to the wall.

After the wall support and coupled to the wall, device 1810 is withdrawn from the mounted wall support. The wall hanging is then hung from the wall support. The top of the wall hanging hung from the wall support (or the other location of the wall hanging) will have a vertical position corresponding to the position of the mark 1820, the formed mark or the located marker 1720 along the wall during mounting of the wall support.

FIGS. 19-29 illustrate wall support for mounting device 1910, another embodiment of wall support mounting device 1110. For ease of illustration, those elements of device 1910 which correspond to elements of device 1110 are numbered similarly. Device 1910 includes coupling unit 1912 and level indicator 1115. Coupling unit 1912 is similar to coupling unit 1112 except that coupling unit 1912 is configured so as to be much more compact and lighter in weight. Coupling unit 1912 additionally includes position assist 1913.

Figure 22:
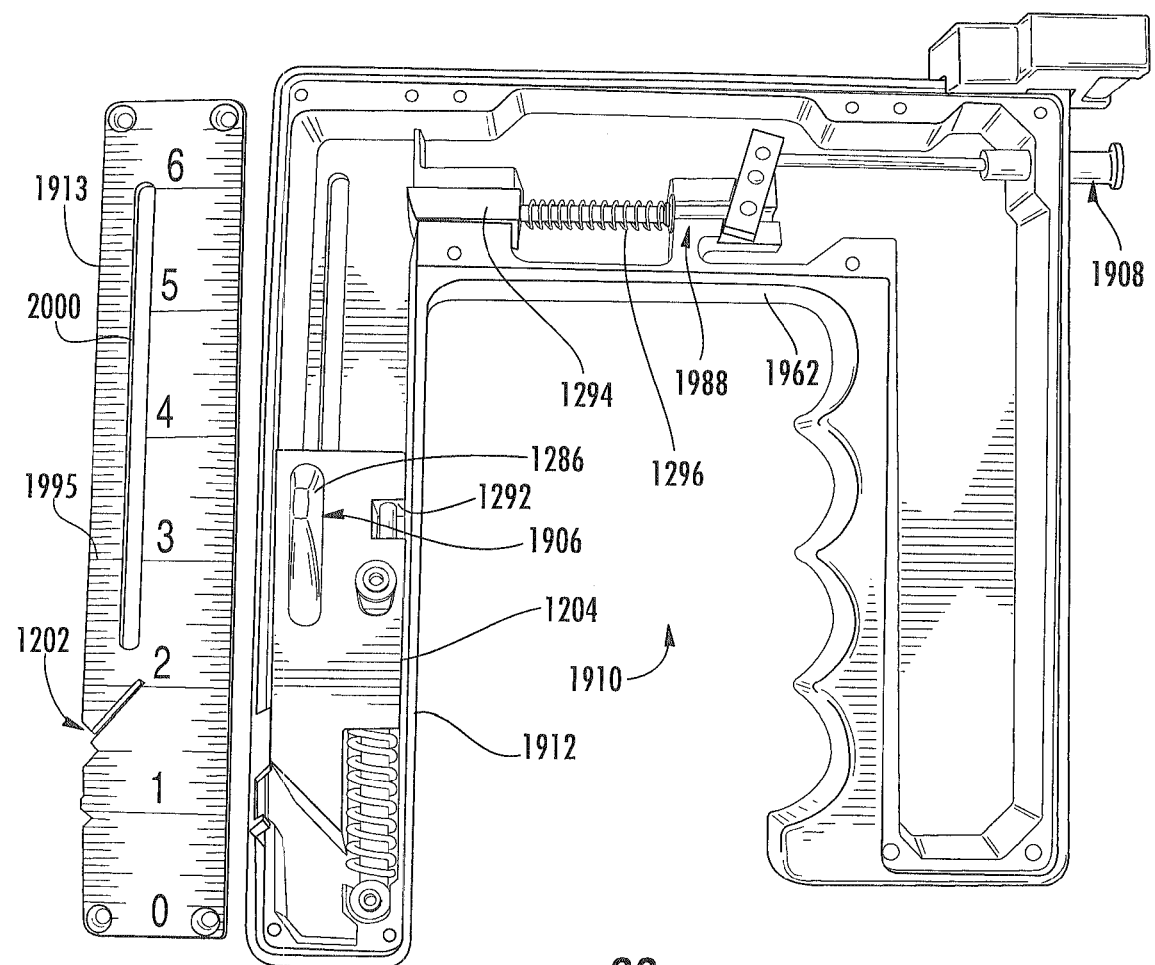
FIG. 22 is an exploded left perspective view of the wall support mounting device of FIG. 19.
Figure 24:
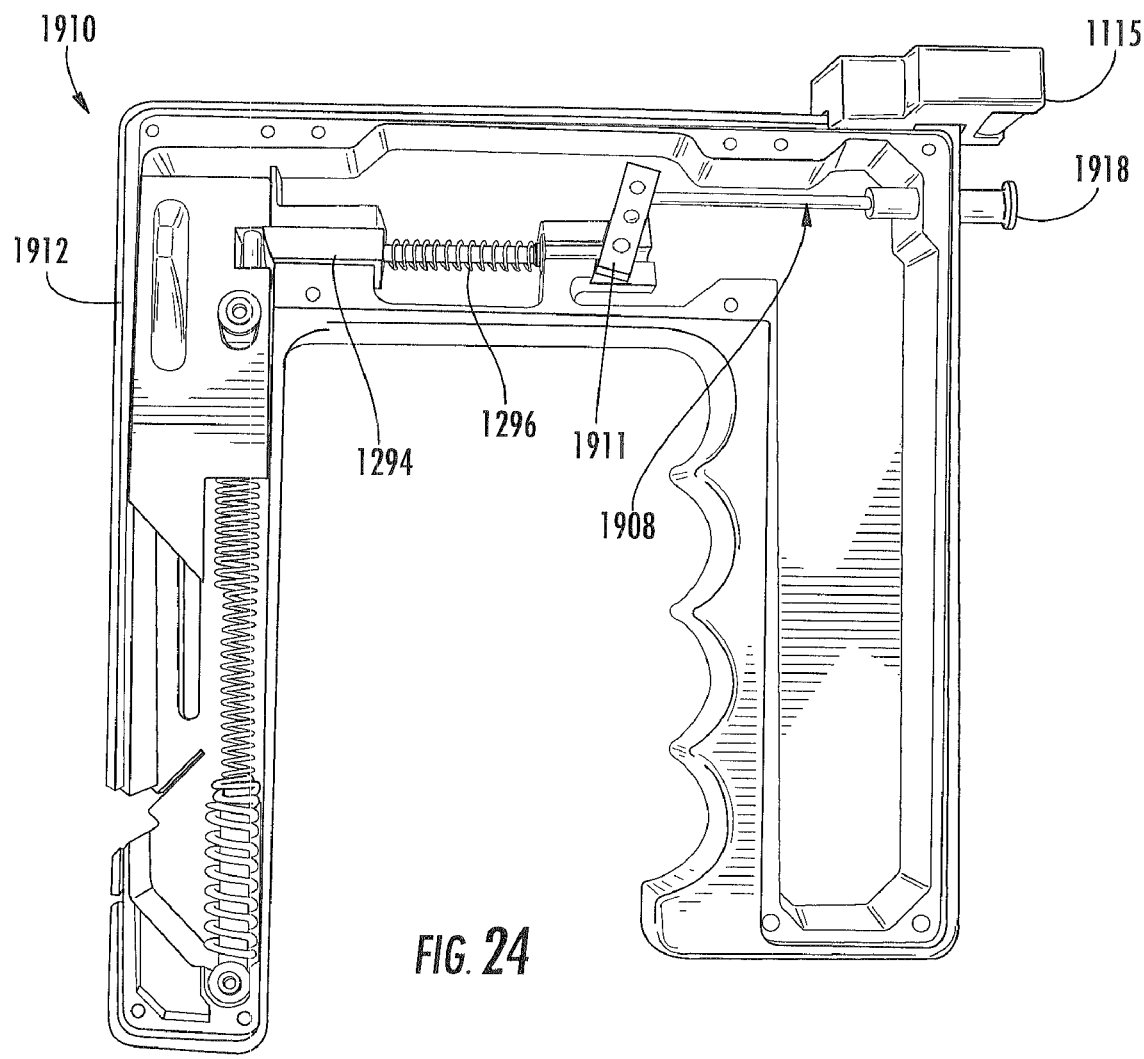
FIG. 24 is a left perspective view of the wall support mounting device of FIG. 19 and a loaded state (with covers omitted).
Figure 25:
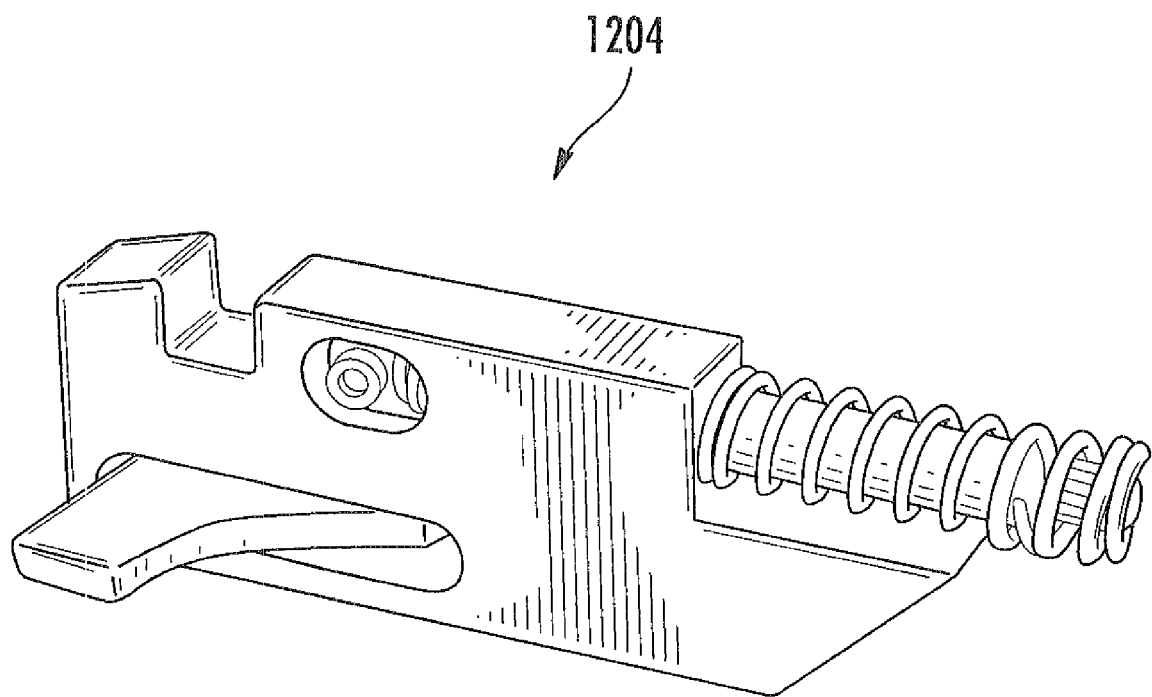
FIG. 25 is a fragmentary perspective view of a drive mechanism of the wall support mounting device of FIG. 19.

As shown by FIGS. 22-24, coupling unit 1910 is similar to coupling unit 1112 in that coupling unit 1912 includes wall support holder 1202, wall interface 1203 (shown in FIG. 21) and drive mechanism 1204. Coupling unit 1912 is different from coupling unit 1112 in that coupling unit 1912 includes loading mechanism 1906 and trigger mechanism 1908 in place of loading mechanism 1206 and trigger mechanism 1208, respectively. Loading mechanism 1906 is similar to loading mechanism 1206 except that the loading mechanism 1906 includes retaining mechanism 1988 in lieu of retaining mechanism 1288. As shown by FIG. 22-24, retaining mechanism 1988 and trigger mechanism 1908 generally extend along a single axis substantially perpendicular to the handle portion of coupling unit 1912. As a result, coupling unit 1912 is more compact.

FIGS. 22-24 and 26 illustrate retaining mechanism 1988 and trigger mechanism 1908 in more detail. Retaining mechanism 1988 is similar to retaining mechanism 1288 in that retaining mechanism 1988 includes catch 1292 10 or 1294 and bias member 1296 (described above). Bias member 1296 comprises a compression spring coupled between retainer 1294 and housing 1962. FIG. 24 illustrates bias mechanism 1296 resiliently biasing retainer 1294 in engagement with catch 1292 to retain drive unit 1204 in a loaded state.

Trigger mechanism 1908 actuate retainer 1294 from the retaining or loading position of print shown in FIG. 24) releasing or discharged position. As shown by FIGS. 22 and 23, trigger mechanism 1908 includes pivot bar 1911, rod 1913 and actuation surface 1918. Pivot bar 1911 comprises a structure pivotably connected to housing 1962 four pivotal moment about axis 1919. Pivot bar 1911 has a first portion pivotally connected to retainer mechanism 1988 and a second portion pivotally coupled to rod 1913. Rod 1913 extends from pivot bar 1911 and is connected to actuation surface 1918. Actuation surface 1918 comprises a push button. Depressment of push button 1918 pivots pivot bar 1911 to draw retainer 1294 to the right (as seen in FIGS. 36 and 37) so as to compress bias member 1296 and to withdraw retainer 1294 from catch 1292, permitting drive mechanism 1204 to drive the wall hanger into a wall.

As shown by FIG. 22, position assist 1913 comprises a member or structure providing a series of incremental measurement or distance markings 1995. In the example illustrated, markings 1995 include English inch increments down to 1/16 of an inch. In other embodiments, metric markings or other non-standardized marking spacings may be employed. In the example illustrated, such markings 1995 extend across and on opposite sides of channel 2000 through which loading member 1286 translates and across wall support holder 1202. As a result, such markings may be larger and are more visible. In particular embodiments, position assist 1913 may be provided as a label, sticker or laminate die cut, stamped otherwise formed so as to have openings sized and located to correspond with channel 2000 and the notches or slits of wall support holder 1202. In yet another embodiment, such markings 1995 may be edged, scratched, molded or otherwise formed in the panel which serves as a cover for coupling unit 1912.

Figure 28:
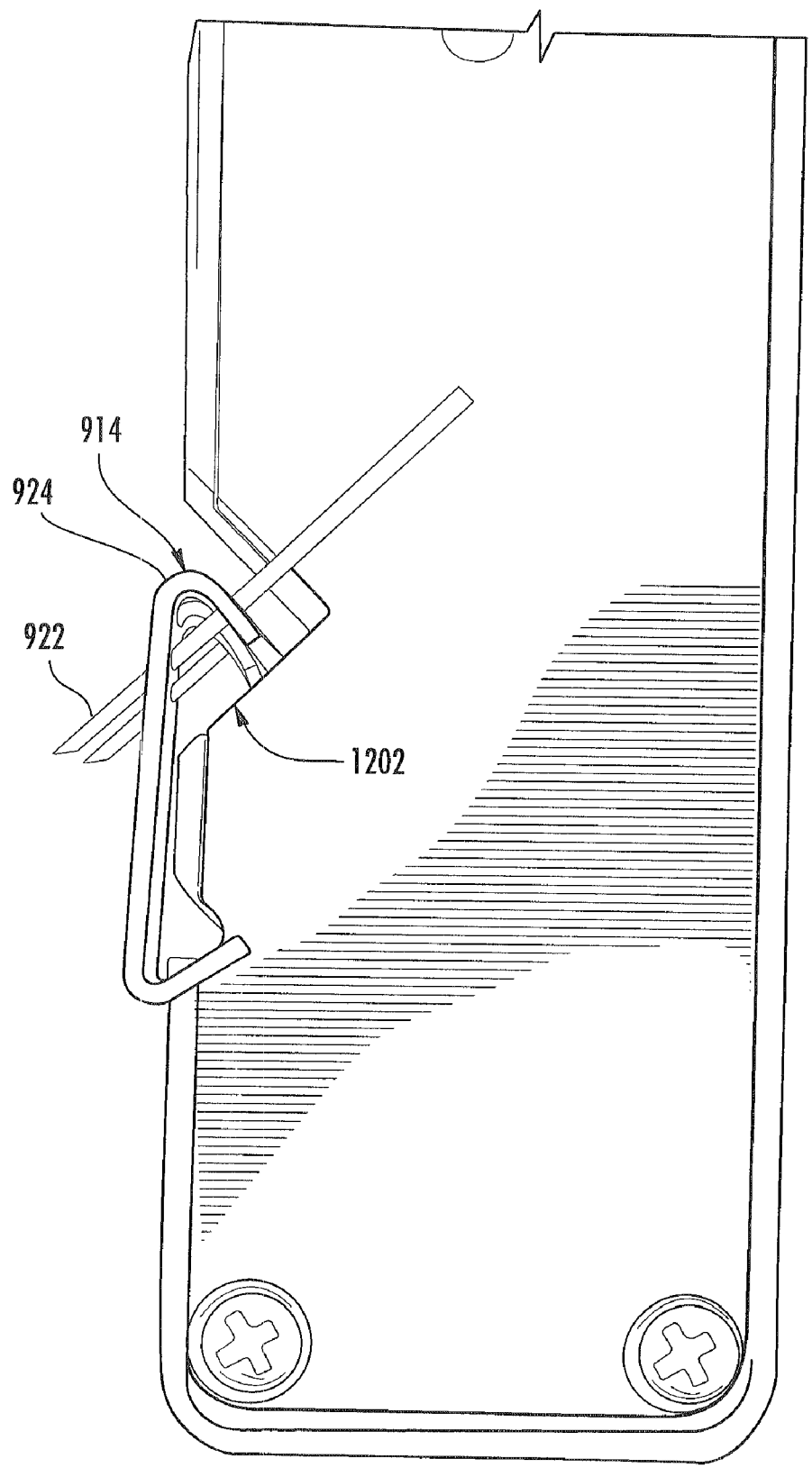
FIG. 28 is a fragmentary left perspective view of the wall support of FIG. 2 mounted on the wall support mounting device of FIG. 19.

FIG. 28. Illustrates wall support 914 held in place by wall support 1202. FIG. 29 illustrates coupling unit 1912 after discharge of drive member 1204. As with coupling unit 1112, coupling unit 1912 is configured to drive wall support 914 into a wall while the wire of the picture other wall hanging is supported by coupling unit 1912 either directly or indirectly via wall support 914. Alternatively, coupling unit 1912 may be used to drive wall support 914 into a wall without the wall hanging being supported by wall support 914 or coupling unit 1912 and to subsequently hang and support the wall hanging from wall support 914. Position assist 1913 facilitates location of wall support 914 at a desired location at the top of the wall hanging will be at a desired location as described above.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

The invention claimed is:

1. A wall support mounting device for use with at least one wall support for a wall hanging having a mounting portion, the device comprising:
    a coupling unit configured to couple the least one wall support to a wall, wherein the unit includes:
    at least one drive surface that moves in a plane contained between the wall hanging and the wall or about an axis contained between the wall hanging and the wall to couple the least one wall support to the wall;
    a trigger mechanism actuatable between an actuated state and a non-actuated state, the trigger mechanism including a manually engageable trigger surface;
    at least one drive mechanism configured to drive the least one drive surface into engagement with the least one wall support in response to actuation of the trigger mechanism to the actuated state, the least one drive mechanism including:
    a spring coupled to the at least one drive surface; and
    a loading mechanism configured to load the spring, wherein the loading mechanism includes a manually engageable loading member coupled to the spring and exposed between the trigger surface and a top of the wall support mounting device,
    wherein the drive surface moves between a loaded state and a discharged state and wherein the loading mechanism comprises:
    a catch associated with the drive surface to move with the drive surface; and
    a retainer movable between a retaining position in which the drive surface is retained in the loaded state and a withdrawn position, permitting the drive surface to move to the discharged state.

2. The device of claim 1 further comprising at least one retention surface configured to retain the least one wall support in a position relative to the mounting portion, wherein the loading member is vertically between the trigger surface and the at least one retention surface.

3. The device of claim 2, wherein the trigger mechanism extends below the least one retention surface.

4. The device of claim 2 wherein the trigger mechanism extends above the least one retention surface.

5. The device of claim 1 further comprising at least one surface configured to retain the least one wall support in a position relative to the mounting portion, wherein the loading member is vertically arranged between the at least one retention surface and a top of the device.

6. The device of claim 1 further comprising a housing, wherein the loading member symmetrically extends from opposite sides of the housing.

7. The device of claim 1, further comprising a housing, wherein the housing has opposing spaced sidewalls through which oppositely extending portions of the loading member extend.

8. The device of claim 7, wherein the sidewalls are spaced by less than or equal to about 0.5 inches.

9. The device of claim 7, wherein the oppositely extending portions have a downwardly facing arcuate edges.

10. The device of claim 1, wherein the retainer is linearly translatable between the retaining position and the withdrawn position.

11. The device of claim 10, wherein the catch includes one of a detent and a projection and wherein the retainer includes the other of the detent and the projection.

12. The device of claim 10, wherein the drive surface moves along a first axis between the loaded state and the discharged state and wherein the retainer moves along a second axis nonparallel to the first axis.

13. The device of claim 12, the second axis along which the retainer moves is substantially perpendicular to the first axis.

14. The device of claim 10, wherein the retainer is resiliently biased towards a retaining position.

15. The device of claim 10, wherein at least one of the retainer and the catch includes a tapered surface configured to facilitate movement of the catch past the retainer.

16. The device of claim 1 further comprising a trigger disabler actuatable between a first state inhibiting actuation of the trigger mechanism and a second state permitting actuation of the trigger mechanism.

17. The device of claim 16, wherein the trigger disabler includes a cover movable between a first position inhibiting sufficient manual engagement with the trigger surface to actuate the trigger mechanism and a second position permitting sufficient manual engagement with the trigger surface to actuate the trigger mechanism.

18. The device of claim 1, wherein the drive surface moves between a loaded state and a discharged state and wherein the device further includes a loading mechanism comprising:
    a catch associated with the drive surface to move with the drive surface; and
    a retainer movable between a retaining position in which the drive surface is retained in the loaded state and a withdrawn position, permitting the drive surface to move to the discharged state, wherein the trigger surface is movable while the retainer is stationary in the retaining position.

19. A wall support mounting device for use with at least one wall support for a wall hanging having a mounting portion, the device comprising:
    a coupling unit configured to couple the least one wall support to a wall, wherein the unit includes:
    at least one drive surface that moves in a plane or about an axis contained between the wall hanging and the wall to couple the least one wall support to the wall;
    a trigger mechanism actuatable between an actuated state and a non-actuated state, the trigger mechanism including a manually engageable trigger surface;
    at least one drive mechanism configured to drive the least one drive surface into engagement with the least one wall support in response to actuation of the trigger mechanism to the actuated state, the least one drive mechanism including:
    a spring coupled to the at least one drive surface;

a loading mechanism configured to load the spring, wherein the loading mechanism includes a manually engageable loading member coupled to the spring and exposed between the trigger surface and a top of the wall support mounting device; and a housing, wherein the loading member symmetrically extends from opposite sides of the housing.

20. A wall support mounting device for use with at least one wall support for a wall hanging having a mounting portion, the device comprising:

a coupling unit configured to couple the least one wall support to a wall, wherein the unit includes:

at least one drive surface that moves in a plane or about an axis contained between the wall hanging and the wall to couple the least one wall support to the wall;

a trigger mechanism actuatable between an actuated state and a non-actuated state, the trigger mechanism including a manually engageable trigger surface;

at least one drive mechanism configured to drive the least one drive surface into engagement with the least one wall support in response to actuation of the trigger mechanism to the actuated state, the least one drive mechanism including:

a spring coupled to the at least one drive surface;

a loading mechanism configured to load the spring, wherein the loading mechanism includes a manually engageable loading member coupled to the spring and exposed between the trigger surface and a top of the wall support mounting device; and a trigger disabler actuatable between a first state inhibiting actuation of the trigger mechanism and a second state permitting actuation of the trigger mechanism.

* * * * *